US012694654B2

(12) United States Patent
He et al.

(10) Patent No.: US 12,694,654 B2
(45) Date of Patent: Jul. 28, 2026

(54) MODEL TRAINING METHOD AND RELATED DEVICE

(71) Applicant: HUAWEI TECHNOLOGIES CO., LTD., Shenzhen (CN)

(72) Inventors: Jianzhong He, Beijing (CN); Shuaijun Chen, Shenzhen (CN); Xu Jia, Shenzhen (CN); Jianzhuang Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 306 days.

(21) Appl. No.: 18/237,550

(22) Filed: Aug. 24, 2023

(65) Prior Publication Data

US 2023/0401830 A1 Dec. 14, 2023

Related U.S. Application Data

(63) Continuation of application No. PCT/CN2022/077802, filed on Feb. 25, 2022.

(30) Foreign Application Priority Data

Feb. 26, 2021 (CN) .......................... 202110217479.4

(51) Int. Cl.
*G06V 10/774* (2022.01)
*G06N 3/045* (2023.01)
(Continued)

(52) U.S. Cl.
CPC ......... *G06V 10/7753* (2022.01); *G06N 3/045* (2023.01); *G06V 10/26* (2022.01); *G06V 10/56* (2022.01)

(58) Field of Classification Search
CPC .... G06V 10/7753; G06V 10/26; G06V 10/56; G06V 10/82; G06N 3/045; G06N 3/084;
(Continued)

(56) References Cited

U.S. PATENT DOCUMENTS 11,188,795 B1* 11/2021 Lee ...................... G06V 10/454
2016/0275366 A1* 9/2016 Yamamoto ................ G06T 3/02
(Continued)

FOREIGN PATENT DOCUMENTS

CN 108197670 A 6/2018
CN 113065633 A 7/2021

OTHER PUBLICATIONS

Kaiyang Zhou et al:"Domain Adaptive Ensemble Learning",arxiv. org,Cornell University Library,201 Olin Library Cornell University Ithaca,NY 14853,Mar. 16, 2020 (Mar. 16, 2020),XP081622220,total 19 pages.

(Continued)

*Primary Examiner* — Xuemei G Chen
(74) *Attorney, Agent, or Firm* — WOMBLE BOND DICKINSON (US) LLP

(57) ABSTRACT

This application provides a model training method in the artificial intelligence field. In a process of determining a loss used to update a model parameter, factors are comprehensively considered. Therefore, an obtained neural network has a strong generalization capability. The method in this application includes: obtaining a first source domain image associated with a target domain image and a second source domain image associated with the target domain image; obtaining a first prediction label of the first source domain image and a second prediction label of the second source domain image through a first to-be-trained model; obtaining a first loss based on the first prediction label and the second prediction label, where the first loss indicates a difference between the first prediction label and the second prediction label; and updating a parameter of the first to-be-trained model based on the first loss, to obtain a first neural network.

18 Claims, 11 Drawing Sheets

(51) Int. Cl.
  *G06V 10/26*　　　(2022.01)
  *G06V 10/56*　　　(2022.01)

(58) Field of Classification Search
  CPC ...... G06N 3/096; G06N 3/0464; Y02T 10/40;
  G06F 16/5866
  See application file for complete search history.

(56) References Cited

U.S. PATENT DOCUMENTS

| | | | |
|---|---|---|---|
| 2017/0031953 A1* | 2/2017 | Tang | G06V 40/172 |
| 2019/0244107 A1* | 8/2019 | Murez | G06V 10/764 |
| 2019/0325299 A1* | 10/2019 | Oliveira Pinheiro | G06N 3/08 |
| 2020/0134444 A1* | 4/2020 | Chen | G06N 3/094 |
| 2020/0151457 A1* | 5/2020 | Sharma | G06V 10/267 |
| 2020/0175662 A1* | 6/2020 | Wang | A61B 6/03 |
| 2021/0012198 A1* | 1/2021 | Zhang | G06N 3/08 |
| 2021/0064907 A1* | 3/2021 | Yang | G06F 18/2155 |
| 2021/0312674 A1* | 10/2021 | Abrol | G06N 3/088 |
| 2021/0407086 A1* | 12/2021 | Liu | G06N 3/08 |
| 2022/0076074 A1* | 3/2022 | Li | G06V 10/82 |
| 2022/0092420 A1* | 3/2022 | Lu | G06N 3/088 |
| 2022/0148191 A1* | 5/2022 | Liu | G06N 3/045 |
| 2023/0000333 A1* | 1/2023 | Yamazaki | A61B 1/0638 |
| 2023/0051411 A1* | 2/2023 | Chen | G06V 10/774 |
| 2023/0267709 A1* | 8/2023 | Chen | G06V 30/19147 382/118 |
| 2023/0281974 A1* | 9/2023 | Ramamonjison | G06V 10/764 382/157 |
| 2023/0289614 A1* | 9/2023 | Takehara | G06V 10/776 |
| 2024/0104902 A1* | 3/2024 | Namiki | G06V 10/98 |

OTHER PUBLICATIONS

Ruijia Xu et al., "Deep Cocktail Network: Multi-source Unsupervised Domain Adaptation with Category Shift," Mar. 2, 2018, total: 10pages.

Sicheng Zhao et al., "Multi-source Domain Adaptation for Semantic Segmentation," Oct. 27, 2019, total: 14pages.

\* cited by examiner

MODEL TRAINING METHOD AND RELATED DEVICE

CROSS-REFERENCE TO RELATED APPLICATIONS

This application is a continuation of International Application No. PCT/CN2022/077802, filed on Feb. 25, 2022, which claims priority to Chinese Patent Application No. 202110217479.4, filed on Feb. 26, 2021. The disclosures of the aforementioned applications are hereby incorporated by reference in their entireties.

TECHNICAL FIELD

This application relates to the field of artificial intelligence technologies, and in particular, to a model training method and a related device.

BACKGROUND

Image semantic segmentation is one of core tasks in the computer vision field. This technology may be used to perform feature extraction on an image by using a neural network, to assign, to each pixel in the image, a label of a category to which each pixel belongs. In the image semantic segmentation technology, to save time costs of a training process of the neural network, a domain adaptive technology emerges.

In the domain adaptive technology, a to-be-trained model, a target domain image, and a source domain image associated with the target domain image may be first obtained, and a label of each pixel in the source domain image is known. Then, a prediction label of the target domain image and a prediction label of the source domain image are obtained through the to-be-trained model, and a loss corresponding to the to-be-trained model is determined based on the prediction label of the target domain image and the prediction label of the source domain image. Finally, a parameter of the to-be-trained model is updated based on the loss, to complete training of the to-be-trained model, and the neural network used for image semantic segmentation may be obtained.

In the foregoing training process, the loss used to update the model parameter is determined based on only a relationship between the source domain image and the target domain image. Because only a single factor is considered, the neural network obtained through training in this manner usually has a poor generalization capability.

SUMMARY

Embodiments of this application provide a model training method and a related device. In a process of determining a loss used to update a model parameter, factors are comprehensively considered. Therefore, an obtained neural network has a strong generalization capability.

A first aspect of embodiments of this application provides a model training method. The method includes:

When a first to-be-trained model and a second to-be-trained model need to be trained, a first source domain image associated with a target domain image and a second source domain image associated with the target domain image may be first obtained. The first source domain image and the second source domain image are two images that belong to different source domains.

Then, a first prediction label of the first source domain image and a second prediction label of the second source domain image are obtained through the first to-be-trained model. It may be understood that the first prediction label is a prediction label of the first to-be-trained model for the first source domain image, and the second prediction label is a prediction label of the first to-be-trained model for the second source domain image.

Next, a loss used to update a parameter of the first to-be-trained model, namely, a first loss, is obtained based on the first prediction label and the second prediction label, where the first loss indicates a difference between the first prediction label and the second prediction label. In this way, in a process of determining the first loss, a relationship between the first source domain image and the second source domain image is considered.

Finally, the parameter of the first to-be-trained model is updated based on the first loss until a model training condition is met, to obtain a first neural network.

It may be learned from the foregoing method that, after the first source domain image and the second source domain image that are associated with the target domain image are obtained, the first prediction label of the first source domain image and the second prediction label of the second source domain image may be obtained through the first to-be-trained model. Then, the first loss is determined based on the first prediction label and the second prediction label. In the process of determining the first loss, a relationship between the first prediction label and the second prediction label (namely, a relationship between a plurality of source domain images) obtained through the first to-be-trained model is considered. Because factors are comprehensively considered, the first neural network obtained by performing parameter update based on the first loss has a strong generalization capability.

In an embodiment, when the first to-be-trained model and the second to-be-trained model need to be trained, the first source domain image associated with the target domain image and the second source domain image associated with the target domain image may be first obtained. The first source domain image and the second source domain image are two images that belong to different source domains. The first source domain image corresponds to the first to-be-trained model, the second source domain image corresponds to the second to-be-trained model, a label of the first source domain image and a label of the second source domain image are known, and a label of the target domain image is unknown. It should be noted that the foregoing image association means that these images are associated with each other in a training task. For example, when the first to-be-trained model is trained, the first source domain image and the second source domain image need to be cooperatively used, to obtain the label of the target domain image. Similarly, when the second to-be-trained model is trained, the first source domain image and the second source domain image also need to be cooperatively used, to obtain the label of the target domain image. Therefore, both the first source domain image and the second source domain image are images associated with the target domain image.

Next, the first prediction label of the first source domain image and the second prediction label of the second source domain image are obtained through the first to-be-trained model, and a third prediction label of the first source domain image and a fourth prediction label of the second source domain image are obtained through the second to-be-trained model. It may be understood that the first prediction label is a prediction label of the first to-be-trained model for the first source domain image, the second prediction label is a prediction label of the first to-be-trained model for the second source domain image, the third prediction label is a prediction label of the second to-be-trained model for the first source domain image, and the fourth prediction label is a prediction label of the second to-be-trained model for the second source domain image.

Then, the loss used to update the parameter of the first to-be-trained model, namely, the first loss, is determined based on the first prediction label, the second prediction label, and the fourth prediction label. Simultaneously, a loss used to update a parameter of the second to-be-trained model, namely, a second loss, is determined based on the first prediction label, the third prediction label, and the fourth prediction label. In this way, in processes of determining the first loss and the second loss, a relationship between the first source domain image and the second source domain image and a relationship between the first to-be-trained model and the second to-be-trained model are considered. That is, a relationship between a plurality of source domain images (for example, similarity and difference between the plurality of source domain images) and a relationship between a plurality of models (for example, reference between the plurality of models, namely, mutual learning between the models) are considered. Factors are comprehensively considered.

Finally, the parameter of the first to-be-trained model is updated based on the first loss until the model training condition is met, to obtain the first neural network, and the parameter of the second to-be-trained model is updated based on the second loss, until the model training condition is met, to obtain a second neural network.

It may be learned from the foregoing implementation that, after the first source domain image and the second source domain image that are associated with the target domain image are obtained, the first prediction label of the first source domain image and the second prediction label of the second source domain image may be obtained through the first to-be-trained model, and the third prediction label of the first source domain image and the fourth prediction label of the second source domain image may be obtained through the second to-be-trained model. Then, the first loss is determined based on the first prediction label, the second prediction label, and the fourth prediction label, and the second loss is determined based on the first prediction label, the third prediction label, and the fourth prediction label. In the process of determining the first loss, the relationship between the first prediction label and the second prediction label (namely, the relationship between the plurality of source domain images) obtained through the first to-be-trained model is considered. On this basis, an impact (namely, the relationship between the plurality of models) caused by the fourth prediction label obtained through the second to-be-trained model is further considered. Similarly, in the process of determining the second loss, the relationship between the plurality of source domain images and the relationship between the plurality of models are also considered. Because factors are comprehensively considered, the first neural network obtained by performing parameter update based on the first loss and the second neural network obtained by performing parameter update based on the second loss have a strong generalization capability.

In an embodiment, that the first loss is determined based on the first prediction label, the second prediction label, and the fourth prediction label includes: The label of the first source domain image is obtained; a first subloss is determined based on the first prediction label and the label of the first source domain image; a second subloss is determined based on the second prediction label and the fourth prediction label; and the first loss is determined based on the first subloss and the second subloss. In an embodiment, because the label of the first source domain image (namely, a real label of the first source domain image) is known, and the first prediction label is the prediction label of the first to-be-trained model for the first source domain image, the first subloss may be determined based on the label of the first source domain image and the prediction label of the first source domain image, and the first subloss indicates a difference between the two labels. Further, because the second prediction label is the prediction label of the first to-be-trained model for the second source domain image, and the fourth prediction label is the prediction label of the second to-be-trained model for the second source domain image, the second subloss may be determined based on the prediction label of the first to-be-trained model for the second source domain image and the prediction label of the second to-be-trained model for the second source domain image, and the second subloss indicates a difference between the two labels. In this way, the parameter of the first to-be-trained model is updated based on the first loss determined by the first subloss and the second subloss, so that the first to-be-trained model can learn a common feature between the plurality of source domain images based on the similarity between the plurality of source domain images and the reference between the plurality of models. This improves a generalization capability of the model.

In an embodiment, that the second loss is determined based on the first prediction label, the third prediction label, and the fourth prediction label includes: The label of the second source domain image is obtained; a third subloss is determined based on the fourth prediction label and the label of the second source domain image; a fourth subloss is determined based on the first prediction label and the third prediction label; and the second loss is determined based on the third subloss and the fourth subloss. In an embodiment, because the label of the second source domain image (namely, a real label of the second source domain image) is known, and the fourth prediction label is the prediction label of the second to-be-trained model for the second source domain image, the third subloss may be determined based on the label of the second source domain image and the prediction label of the second source domain image, and the third subloss indicates a difference between the two labels. Further, because the first prediction label is the prediction label of the first to-be-trained model for the first source domain image, and the third prediction label is the prediction label of the second to-be-trained model for the first source domain image, the fourth subloss may be determined based on the prediction label of the first to-be-trained model for the first source domain image and the prediction label of the second to-be-trained model for the first source domain image, and the fourth subloss indicates a difference between the two labels. In this way, the parameter of the second to-be-trained model is updated based on the second loss determined by the third subloss and the fourth subloss, so that the second to-be-trained model can learn a common feature between the plurality of source domain images based on the similarity between the plurality of source domain images and the reference between the plurality of models. This improves a generalization capability of the model.

In an embodiment, before that the first loss is determined based on the first subloss and the second subloss, the method further includes: A fifth prediction label of the target domain image is obtained through the first to-be-trained model, and a sixth prediction label of the target domain image is obtained through the second to-be-trained model; the label of the target domain image is determined based on the fifth prediction label and the sixth prediction label; a fifth subloss is determined based on the fifth prediction label and the label of the target domain image; and that the first loss is determined based on the first subloss and the second subloss includes: the first loss is determined based on the first subloss, the second subloss, and the fifth subloss. In an embodiment, the label (pseudo label) of the target domain image may be determined based on the prediction label (namely, the fifth prediction label) of the first to-be-trained model for the target domain image and the prediction label (namely, the sixth prediction label) of the second to-be-trained model for the target domain image. Then, the fifth subloss may be determined based on the prediction label of the first to-be-trained model for the target domain image and the label of the target domain image, and the fifth subloss indicates a difference between the two labels. In this way, the parameter of the first to-be-trained model is updated based on the first loss determined by the first subloss, the second subloss, and the fifth subloss, so that the first to-be-trained model can learn a common feature between the plurality of source domain images based on the similarity between the plurality of source domain images and the reference between the plurality of models, and can further learn a feature of the target domain image based on complementarity between the plurality of models (because the pseudo label of the target domain image is determined based on the prediction label of the target domain image obtained by a plurality of to-be-trained models). This improves a generalization capability of the model.

In an embodiment, before that the second loss is determined based on the third subloss and the fourth subloss, the method further includes: A sixth subloss is determined based on the sixth prediction label and the label of the target domain image; and that the second loss is determined based on the third subloss and the fourth subloss includes: the second loss is determined based on the third subloss, the fourth subloss, and the sixth subloss. In an embodiment, the label (pseudo label) of the target domain image may be determined based on the prediction label (namely, the fifth prediction label) of the first to-be-trained model for the target domain image and the prediction label (namely, the sixth prediction label) of the second to-be-trained model for the target domain image. Then, the sixth subloss may be determined based on the prediction label of the second to-be-trained model for the target domain image and the label of the target domain image, and the sixth subloss indicates a difference between the two labels. In this way, the parameter of the second to-be-trained model is updated based on the second loss determined by the third subloss, the fourth subloss, and the sixth subloss, so that the second to-be-trained model can learn a common feature between the plurality of source domain images based on the similarity between the plurality of source domain images and the reference between the plurality of models, and can further learn a feature of the target domain image based on complementarity between the plurality of models (because the pseudo label of the target domain image is determined based on the prediction label of the target domain image obtained by a plurality of to-be-trained models). This improves a generalization capability of the model.

In an embodiment, the method further includes: converting the first source domain image, the second source domain image, and the target domain image from RGB color space to LAB color space; obtaining, in the LAB color space, an average value of the first source domain image, a variance of the first source domain image, an average value of the second source domain image, a variance of the second source domain image, an average value of the target domain image, and a variance of the target domain image; adjusting the first source domain image based on the average value of the first source domain image, the variance of the first source domain image, the average value of the target domain image, and the variance of the target domain image; adjusting the second source domain image based on the average value of the second source domain image, the variance of the second source domain image, the average value of the target domain image, and the variance of the target domain image; and converting an adjusted first source domain image, an adjusted second source domain image, and the target domain image from the LAB color space to the RGB color space. In an embodiment, an image is converted from the RGB color space to the LAB color space, and then a source domain image is adjusted based on a parameter of a source domain image and a parameter of a target domain image, so that distribution of the source domain image is aligned with distribution of the target domain image, an image style of the source domain image is closer to an image style of the target domain image, and distribution differences between source domain images and between the source domain image and the target domain image are reduced.

In an embodiment, the first subloss and the third subloss are cross-entropy losses.

In an embodiment, the second subloss and the fourth subloss are relative-entropy losses.

In an embodiment, the fifth subloss and the sixth subloss are cross-entropy losses or relative-entropy losses.

A second aspect of embodiments of this application provides a model training apparatus. The apparatus includes: an obtaining module, configured to obtain a first source domain image associated with a target domain image and a second source domain image associated with the target domain image; and a training module, configured to obtain a first prediction label of the first source domain image and a second prediction label of the second source domain image through a first to-be-trained model. The training module is further configured to obtain a first loss based on the first prediction label and the second prediction label, where the first loss indicates a difference between the first prediction label and the second prediction label; and the training module is further configured to update a parameter of the first to-be-trained model based on the first loss, to obtain a first neural network.

It may be learned from the foregoing apparatus that, after the first source domain image and the second source domain image that are associated with the target domain image are obtained, the first prediction label of the first source domain image and the second prediction label of the second source domain image may be obtained through the first to-be-trained model. Then, the first loss is determined based on the first prediction label and the second prediction label. In a process of determining the first loss, a relationship between the first prediction label and the second prediction label (namely, a relationship between a plurality of source domain images) obtained through the first to-be-trained model is considered. Because factors are comprehensively considered, the first neural network obtained by performing parameter update based on the first loss has a strong generalization capability.

In an embodiment, the training module is further configured to obtain a third prediction label of the first source domain image and a fourth prediction label of the second source domain image through a second to-be-trained model; and the training module is configured to obtain the first loss based on the first prediction label, the second prediction label, and the fourth prediction label.

In an embodiment, the training module is further configured to: obtain a second loss based on the first prediction label, the third prediction label, and the fourth prediction label; and update a parameter of the second to-be-trained model based on the second loss, to obtain a second neural network.

In an embodiment, the training module is configured to: obtain a label of the first source domain image; obtain a first subloss based on the first prediction label and the label of the first source domain image, where the first subloss indicates a difference between the first prediction label and the label of the first source domain image; obtain a second subloss based on the second prediction label and the fourth prediction label, where the second subloss indicates a difference between the second prediction label and the fourth prediction label; and perform summation based on the first subloss and the second subloss, to obtain the first loss.

In an embodiment, the training module is configured to: obtain a label of the second source domain image; obtain a third subloss based on the fourth prediction label and the label of the second source domain image, where the third subloss indicates a difference between the fourth prediction label and the label of the second source domain image; obtain a fourth subloss based on the first prediction label and the third prediction label, where the fourth subloss indicates a difference between the first prediction label and the third prediction label; and perform summation based on the third subloss and the fourth subloss, to obtain the second loss.

In an embodiment, the training module is further configured to: obtain a fifth prediction label of the target domain image through the first to-be-trained model, and obtain a sixth prediction label of the target domain image through the second to-be-trained model; obtain a label of the target domain image based on the fifth prediction label and the sixth prediction label; and obtain a fifth subloss based on the fifth prediction label and the label of the target domain image, where the fifth subloss indicates a difference between the fifth prediction label and the label of the target domain image; and the training module is configured to perform summation based on the first subloss, the second subloss, and the fifth subloss, to obtain the first loss.

In an embodiment, the training module is further configured to: obtain a sixth subloss based on the sixth prediction label and the label of the target domain image, where the sixth subloss indicates a difference between the sixth prediction label and the label of the target domain image; and the training module is configured to perform summation based on the third subloss, the fourth subloss, and the sixth subloss, to obtain the second loss.

In an embodiment, the first subloss and the third subloss are cross-entropy losses.

In an embodiment, the second subloss and the fourth subloss are relative-entropy losses.

In an embodiment, the fifth subloss and the sixth subloss are cross-entropy losses or relative-entropy losses.

In an embodiment, the obtaining module is further configured to: convert the first source domain image, the second source domain image, and the target domain image from RGB color space to LAB color space; obtain, in the LAB color space, an average value of the first source domain image, a variance of the first source domain image, an average value of the second source domain image, a variance of the second source domain image, an average value of the target domain image, and a variance of the target domain image; adjust the first source domain image based on the average value of the first source domain image, the variance of the first source domain image, the average value of the target domain image, and the variance of the target domain image; adjust the second source domain image based on the average value of the second source domain image, the variance of the second source domain image, the average value of the target domain image, and the variance of the target domain image; and convert an adjusted first source domain image, an adjusted second source domain image, and the target domain image from the LAB color space to the RGB color space.

A third aspect of embodiments of this application provides a model training apparatus. The apparatus includes a memory and a processor. The memory stores code. The processor is configured to execute the code. When the code is executed, the model training apparatus performs the method according to any one of the first aspect or the possible implementations of the first aspect.

A fourth aspect of embodiments of this application provides a circuit system. The circuit system includes a processing circuit. The processing circuit is configured to perform the method according to any one of the first aspect or the possible implementations of the first aspect.

A fifth aspect of embodiments of this application provides a chip system. The chip system includes a processor, configured to invoke a computer program or computer instructions stored in a memory, so that the processor performs the method according to any one of the first aspect or the possible implementations of the first aspect.

In an embodiment, the processor is coupled to the memory through an interface.

In an embodiment, the chip system further includes the memory, and the memory stores the computer program or the computer instructions.

A sixth aspect of embodiments of this application provides a computer storage medium. The computer storage medium stores a computer program. When the program is executed by a computer, the computer is enabled to perform the method according to any one of the first aspect or the possible implementations of the first aspect.

A seventh aspect of embodiments of this application provides a computer program product. The computer program product stores instructions. When the instructions are executed by a computer, the computer is enabled to perform the method according to any one of the first aspect or the possible implementations of the first aspect.

In an embodiment, after the first source domain image and the second source domain image that are associated with the target domain image are obtained, the first prediction label of the first source domain image and the second prediction label of the second source domain image may be obtained through the first to-be-trained model, and the third prediction label of the first source domain image and the fourth prediction label of the second source domain image may be obtained through the second to-be-trained model. Then, the first loss is determined based on the first prediction label, the second prediction label, and the fourth prediction label, and the second loss is determined based on the first prediction label, the third prediction label, and the fourth prediction label. In the process of determining the first loss, the relationship between the first prediction label and the second prediction label (namely, the relationship between the plurality of source domain images) obtained through the first to-be-trained model is considered. On this basis, the impact (namely, the relationship between the plurality of models)

caused by the fourth prediction label obtained through the second to-be-trained model is further considered. Similarly, in the process of determining the second loss, the relationship between the plurality of source domain images and the relationship between the plurality of models are also considered. Because the factors are comprehensively considered, the first neural network obtained by performing parameter update based on the first loss and the second neural network obtained by performing parameter update based on the second loss have a strong generalization capability.

DESCRIPTION OF EMBODIMENTS

The following describes in detail technical solutions in embodiments of this application with reference to the accompanying drawings in embodiments of this application.

In the specification, claims, and accompanying drawings of this application, the terms "first", "second", and the like are intended to distinguish between similar objects but do not necessarily indicate an order or sequence. It should be understood that the terms used in such a way are interchangeable in proper circumstances, and this is merely a distinguishing manner for describing objects having a same attribute in embodiments of this application. In addition, the terms "include", "contain" and any other variants mean to cover the non-exclusive inclusion, so that a process, method, system, product, or device that includes a series of units is not necessarily limited to those units, but may include other units not expressly listed or inherent to such a process, method, system, product, or device.

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result based on the knowledge. In other words, artificial intelligence is a branch of computer science and attempts to understand essence of intelligence and produce a new intelligent machine that can react in a similar manner to human intelligence. The artificial intelligence is to research design principles and implementation methods of various intelligent machines, so that the machines have perception, inference, and decision-making functions.

Figure 1:
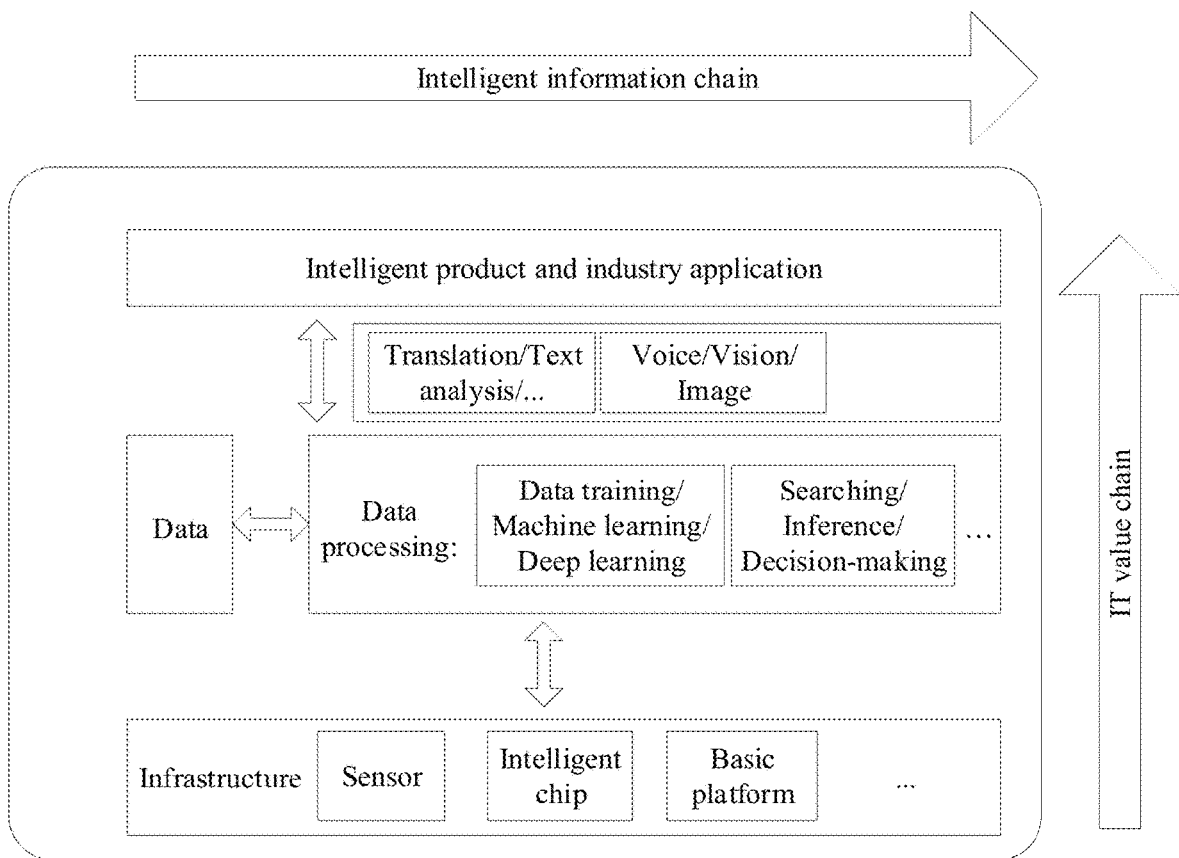
FIG. 1 is a schematic diagram of a structure of an artificial intelligence main framework.

An overall working procedure of an artificial intelligence system is first described with reference to FIG. 1. FIG. 1 is a schematic diagram of a structure of an artificial intelligence main framework. The following describes the artificial intelligence main framework from two perspectives: an "intelligent information chain" (e.g., a horizontal axis) and an "IT value chain" (e.g., a vertical axis). The "intelligent information chain" indicates a series of processes from obtaining data to processing the data. For example, the process may be a general process of intelligent information perception, intelligent information representation and formation, intelligent inference, intelligent decision-making, and intelligent execution and output. In this process, the data undergoes a refinement process of "data-information-knowledge-intelligence". The "IT value chain" indicates a value brought by artificial intelligence to the information technology industry from an underlying infrastructure and information (technology providing and processing implementation) of artificial intelligence to an industrial ecological process of a system.

(1) Infrastructure

The infrastructure provides computing capability support for the artificial intelligence system, implements communication with the external world, and implements support through a basic platform. The infrastructure communicates with the outside through sensors. A computing capability is provided by intelligent chips (hardware acceleration chips such as a CPU, an NPU, a GPU, an ASIC, and an FPGA). The basic platform includes a related platform, for example, a distributed computing framework and network, for assurance and support. The basic platform may include a cloud storage and computing network, an interconnection network, and the like. For example, the sensor communicates with the outside to obtain data, and the data is provided to an intelligent chip in a distributed computing system provided by the basic platform for computing.

(2) Data

Data at an upper layer of the infrastructure indicates a data source in the artificial intelligence field. The data relates to a graph, an image, a voice, and text, further relates to internet of things data of a conventional device, and includes service data of an existing system and perception data such as force, displacement, a liquid level, a temperature, and humidity.

(3) Data Processing

Data processing usually includes a manner such as data training, machine learning, deep learning, searching, inference, or decision-making.

Machine learning and deep learning may mean performing symbolic and formalized intelligent information modeling, extraction, preprocessing, training, and the like on data.

Inference is a process in which a human intelligent inference manner is simulated in a computer or an intelligent system, and machine thinking and problem resolving are performed by using formalized information according to an inference control policy. A typical function is searching and matching.

Decision-making is a process in which a decision is made after intelligent information is inferred, and usually provides functions such as classification, ranking, and prediction.

(4) General Capability

After the data processing mentioned above is performed on data, some general capabilities may further be formed based on a data processing result, for example, an algorithm or a general system such as translation, text analysis, computer vision processing, voice recognition, and image recognition.

(5) Intelligent Product and Industry Application

The intelligent product and industry application are products and applications of the artificial intelligence system in various fields. The intelligent product and industry application involve packaging overall artificial intelligence solutions, to productize and apply intelligent information decision-making. Application fields of the intelligent information decision-making mainly include intelligent terminals, intelligent transportation, intelligent health care, autonomous driving, intelligent cities, and the like.

The following describes several application scenarios of this application.

Figure 2A:
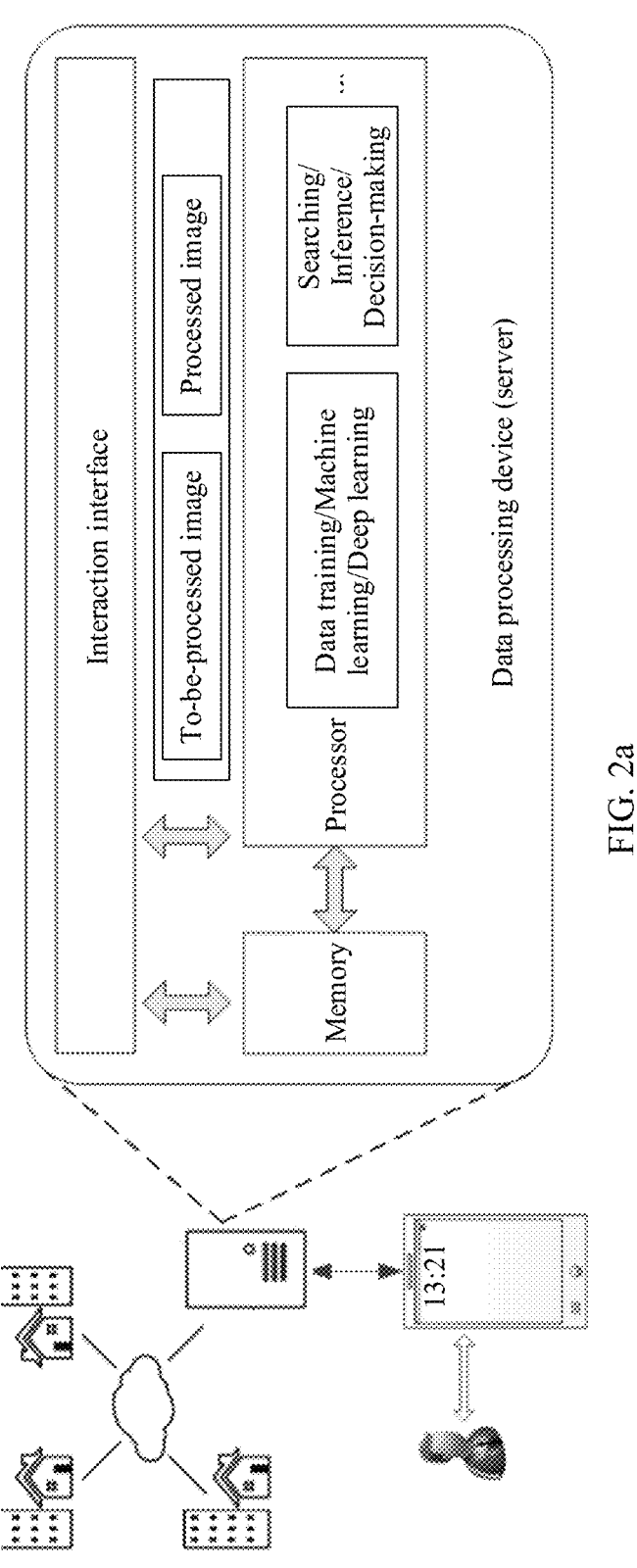
FIG. 2a is a schematic diagram of a structure of an image processing system according to an embodiment of this application.

FIG. 2a is a schematic diagram of a structure of an image processing system according to an embodiment of this application. The image processing system includes user equipment and a data processing device. The user equipment includes an intelligent terminal such as a mobile phone, a personal computer, or an information processing center. The user equipment is an initiating end of image processing. As an initiator of an image enhancement request, a user usually initiates the request through the user equipment.

The data processing device may be a device or server having a data processing function, such as a cloud server, a network server, an application server, or a management server. The data processing device receives the image enhancement request from the intelligent terminal through an interaction interface, and then performs, through a memory storing data and a processor processing data, image processing in a manner such as machine learning, deep learning, searching, inference, or decision-making. The memory in the data processing device may be an umbrella term, and includes a local storage and a database storing historical data. The database may be in the data processing device, or may be in another network server.

In the image processing system shown in FIG. 2a, the user equipment may receive an instruction from the user. For example, the user equipment may obtain an image input/selected by the user, and then initiate a request to the data processing device, so that the data processing device executes an image semantic segmentation application on the image obtained by the user equipment, to obtain a corresponding processing result for the image. For example, the user equipment may obtain a to-be-processed image input by the user, and then initiate an image processing request to the data processing device, so that the data processing device executes an image processing application (for example, image semantic segmentation) on the image, to obtain a processed image (including the image and a label of the image).

In FIG. 2a, the data processing device may perform the data processing method in embodiments of this application.

Figure 2B:
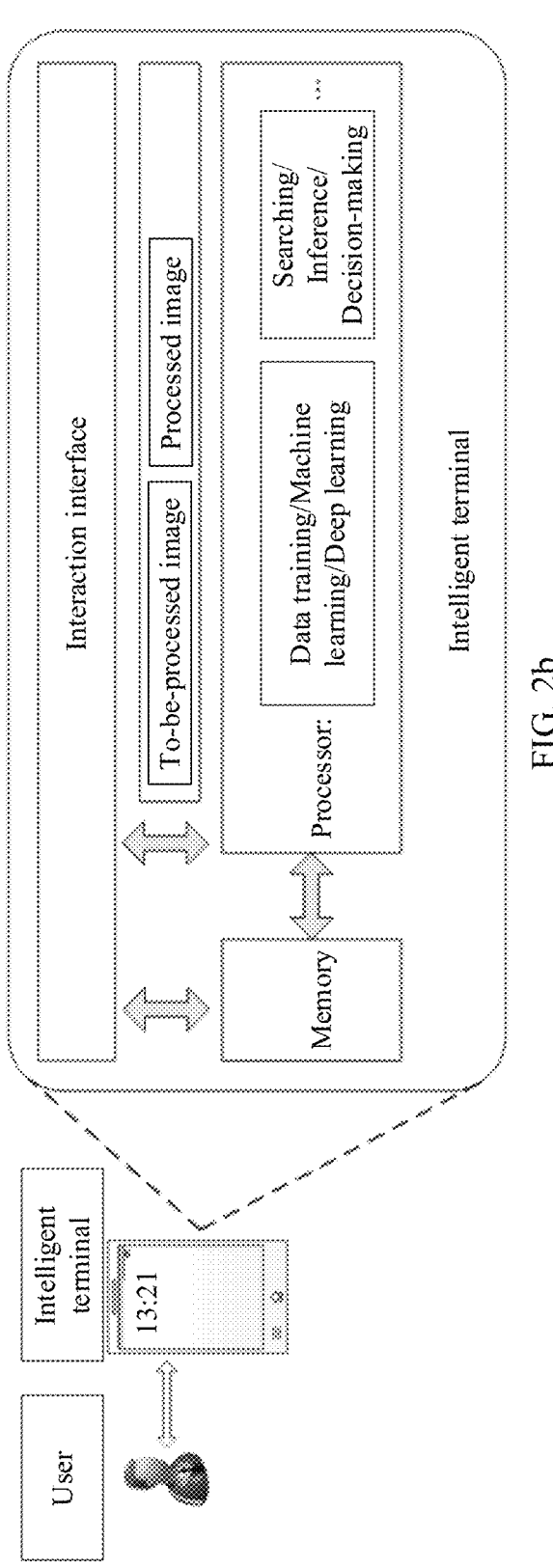
FIG. 2b is another schematic diagram of a structure of an image processing system according to an embodiment of this application.

FIG. 2b is another schematic diagram of a structure of an image processing system according to an embodiment of this application. In FIG. 2b, user equipment is directly used as a data processing device. The user equipment can directly obtain an input from a user and directly process the input by hardware of the user equipment. A process is similar to that in FIG. 2a. For details, refer to the foregoing descriptions. Details are not described herein again.

In the image processing system shown in FIG. 2b, the user equipment may receive an instruction from the user. For example, the user equipment may obtain a to-be-processed image selected by the user from the user equipment, and then the user equipment executes an image processing application (for example, image semantic segmentation) on the image, to obtain a corresponding processing result for the image.

In FIG. 2b, the user equipment may perform the data processing method in embodiments of this application.

Figure 2C:
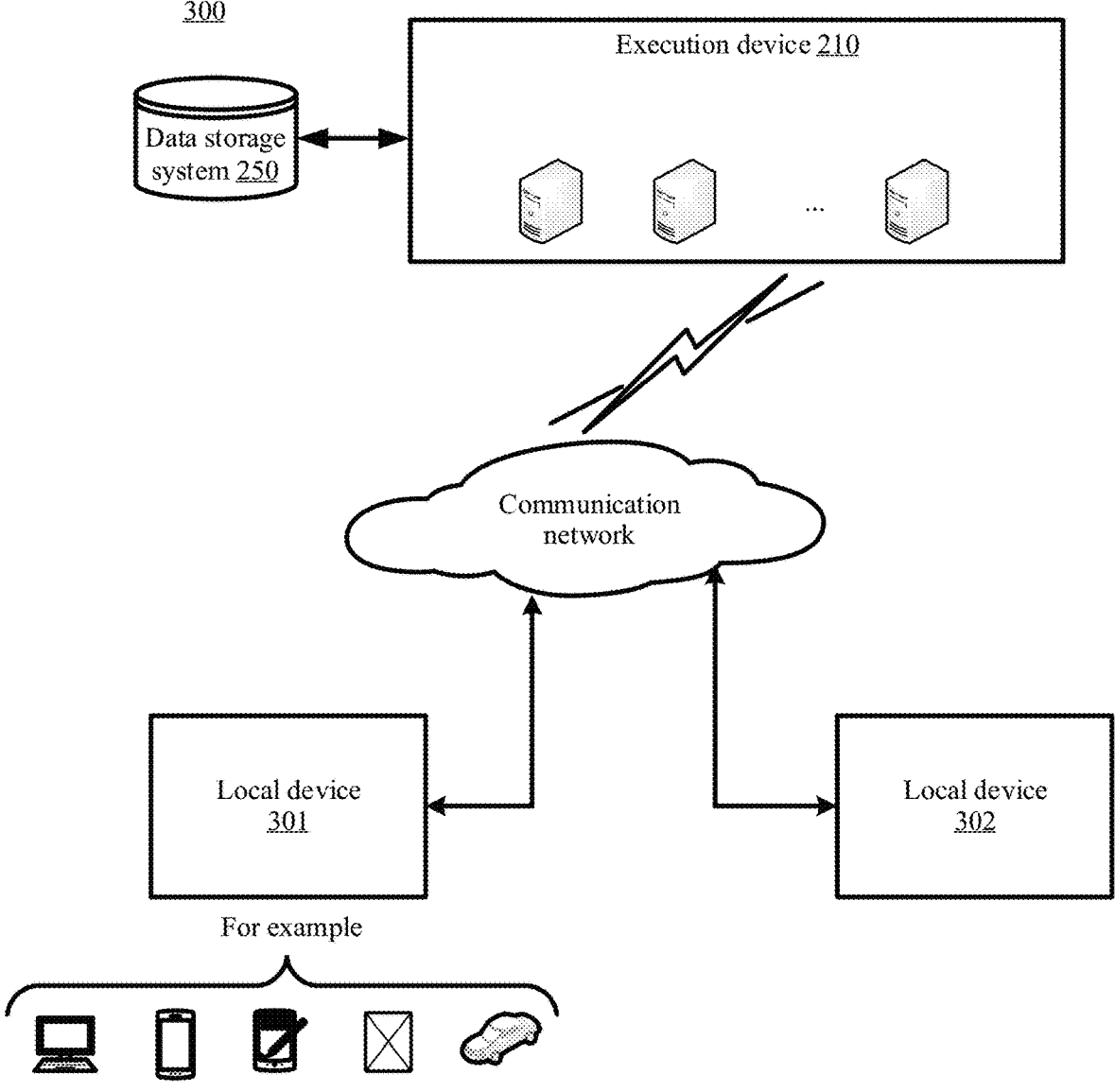
FIG. 2c is a schematic diagram of an image processing related device according to an embodiment of this application.

FIG. 2c is a schematic diagram of an image processing related device according to an embodiment of this application.

The user equipment in FIG. 2a and FIG. 2b may be a local device 301 or a local device 302 in FIG. 2c. The data processing device in FIG. 2a may be an execution device 210 in FIG. 2c. A data storage system 250 may store data to be processed by the execution device 210. The data storage system 250 may be integrated into the execution device 210, or may be disposed on a cloud or another network server.

The processor in FIG. 2a and FIG. 2b may perform data training/machine learning/deep learning by using a neural network model or another model (for example, a model based on a support vector machine), and execute an image processing application on an image by using a model obtained through final training or learning based on data, to obtain a corresponding processing result.

Figure 3A:
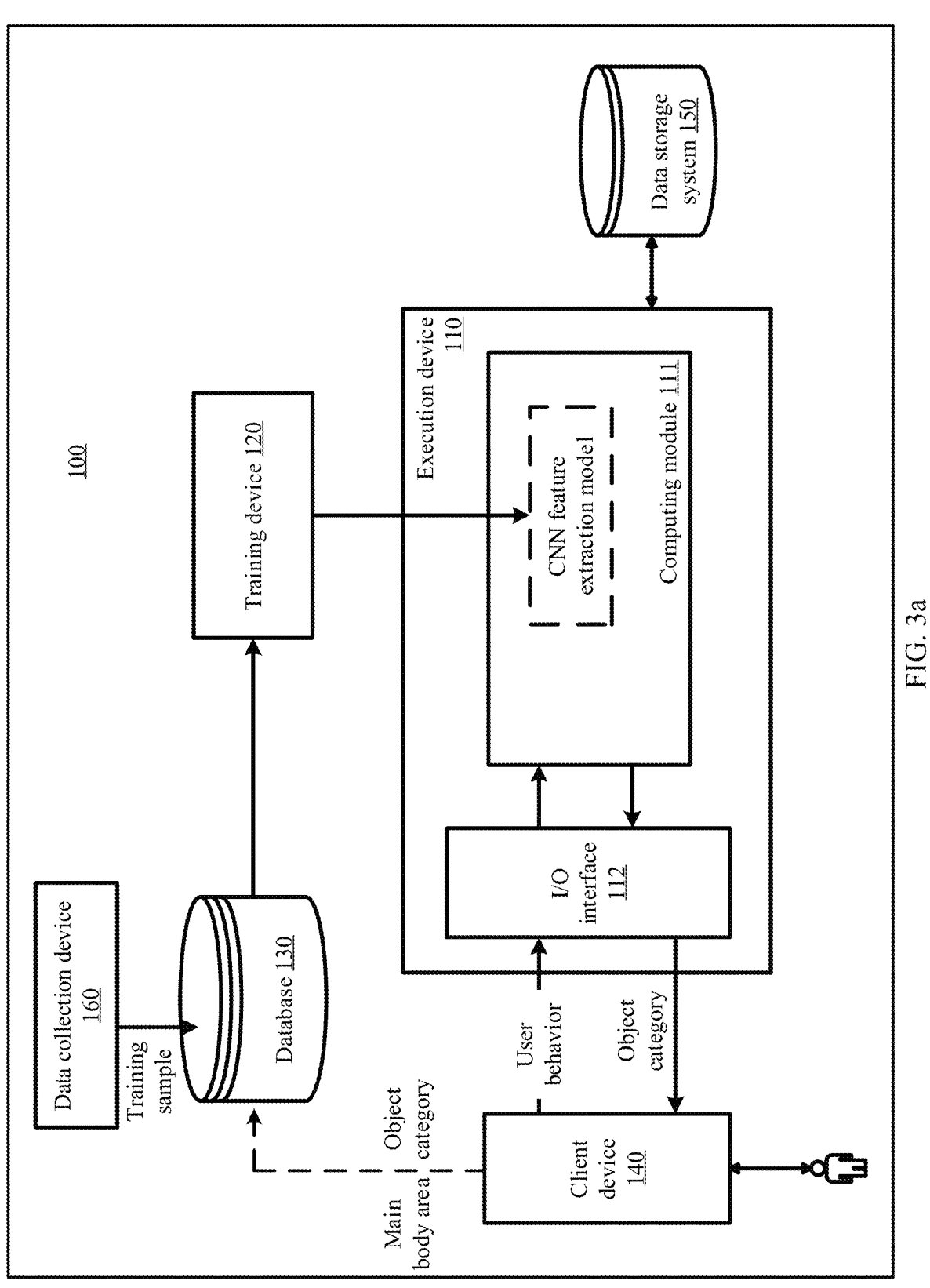
FIG. 3a is a schematic diagram of an architecture of a system 100 according to an embodiment of this application.

FIG. 3a is a schematic diagram of an architecture of a system 100 according to an embodiment of this application. In FIG. 3a, an execution device 110 configures an input/output (I/O) interface 112, configured to exchange data with an external device. A user may input data to the I/O interface 112 through a client device 140. The input data in an embodiment of the application may include each to-be-scheduled task, a resource that can be invoked, and another parameter.

In a process in which the execution device 110 preprocesses the input data, or in a process in which a computing module 111 of the execution device 110 performs related processing such as computing (for example, implementing a function of a neural network in this application), the execution device 110 may invoke data, code, and the like in a data storage system 150 for corresponding processing, and may further store, in the data storage system 150, data, instructions, and the like that are obtained through the corresponding processing.

Finally, the I/O interface 112 returns a processing result to the client device 140, to provide the processing result to the user.

It should be noted that a training device 120 may generate corresponding target models/rules for different targets or different tasks based on different training data. The corresponding target models/rules may be used to implement the foregoing targets or complete the foregoing tasks, to provide a required result for the user. The training data may be stored in a database 130, and is a training sample collected by a data collection device 160.

In a case shown in FIG. 3a, the user may manually provide input data and the user may manually provide the input data in an interface provided by the I/O interface 112. In another case, the client device 140 may automatically send input data to the I/O interface 112. If it is required that the client device 140 needs to obtain authorization from the user to automatically send the input data, the user may set corresponding permission on the client device 140. The user may view, on the client device 140, a result output by the execution device 110. For example, the result may be presented in a form of displaying, a sound, an action, or the like. The client device 140 may alternatively be used as a data collection end, to collect, as new sample data, input data input to the I/O interface 112 and an output result output from the I/O interface 112 that are shown in the figure, and store the new sample data in the database 130. Certainly, the client device 140 may alternatively not perform collection. Instead, the I/O interface 112 directly stores, in the database 130 as new sample data, the input data input to the I/O interface 112 and the output result output from the I/O interface 112 that are shown in the figure.

It should be noted that FIG. 3a is merely a schematic diagram of an architecture of a system according to an embodiment of this application. A location relationship between a device, a component, a module, and the like shown in the figure constitutes no limitation. For example, in FIG. 3a, the data storage system 150 is an external memory relative to the execution device 110. In another case, the data storage system 150 may alternatively be disposed in the execution device 110. As shown in FIG. 3a, the neural network may be obtained through training based on the training device 120.

An embodiment of this application further provides a chip. The chip includes a neural-network processing unit NPU. The chip may be disposed in the execution device 110 shown in FIG. 3a, to complete computing work of the computing module 111. The chip may alternatively be disposed in the training device 120 shown in FIG. 3a, to complete training work of the training device 120 and output a target model/rule.

The neural-network processing unit NPU is mounted to a host central processing unit (CPU) (host CPU) as a coprocessor. The host CPU allocates a task. A core part of the NPU is an operation circuit, and a controller controls the operation circuit to extract data in a memory (a weight memory or an input memory) and perform an operation.

In an embodiment, the operation circuit includes a plurality of process engines (PEs) inside. In an embodiment, the operation circuit is a two-dimensional systolic array. The operation circuit may alternatively be a one-dimensional systolic array or another electronic circuit capable of performing mathematical operations such as multiplication and addition. In an embodiment, the operation circuit is a general-purpose matrix processor.

For example, it is assumed that there is an input matrix A, a weight matrix B, and an output matrix C. The operation circuit fetches, from the weight memory, data corresponding to the matrix B, and buffers the data on each PE in the operation circuit. The operation circuit fetches data of the matrix A from the input memory, to perform a matrix operation on the matrix B, and stores an obtained partial result or an obtained final result of the matrix in an accumulator.

A vector computing unit may perform further processing on an output of the operation circuit, for example, vector multiplication, vector addition, an exponential operation, a logarithmic operation, and value comparison. For example, the vector computing unit may be configured to perform network computing such as pooling, batch normalization, or local response normalization (local response normalization) at a non-convolutional/non-FC layer in the neural network.

In an embodiment, the vector computing unit can store a processed output vector in a unified buffer. For example, the vector computing unit may apply a non-linear function to the output of the operation circuit, for example, a vector of an accumulated value, to generate an activation value. In an embodiment, the vector computing unit generates a normalized value, a combined value, or both a normalized value and a combined value. In an embodiment, the processed output vector can be used as an activation input in the operation circuit, for example, used at a subsequent layer in the neural network.

A unified memory is configured to store input data and output data.

For weight data, a direct memory access controller (DMAC) directly transfers input data in an external memory to the input memory and/or the unified memory, stores the weight data in the external memory in the weight memory, and stores the data in the unified memory in the external memory.

A bus interface unit (BIU) is configured to implement interaction between the host CPU, the DMAC, and an instruction fetch buffer through a bus.

The instruction fetch buffer connected to the controller is configured to store instructions used by the controller.

The controller is configured to invoke the instructions buffered in the instruction fetch buffer, to control a working process of the operation accelerator.

Usually, the unified memory, the input memory, the weight memory, and the instruction fetch buffer each are an on-chip memory. The external memory is a memory outside the NPU. The external memory may be a double data rate synchronous dynamic random access memory (DDR SDRAM), a high bandwidth memory (HBM), or another readable and writable memory.

Embodiments of this application relate to massive application of a neural network. Therefore, for ease of understanding, the following first describes terms and concepts related to the neural network in embodiments of this application.

(1) Neural Network

The neural network may include a neuron. The neuron may be an operation unit that uses xs and an intercept of 1 as an input. An output of the operation unit may be as follows:

$$h_{W,b}(x) = f(W^T x) = f\left(\sum_{s=1}^{n} W_s x_s + b\right) \tag{1}$$

s=1, 2, . . . , or n. n is a natural number greater than 1. Ws is a weight of xs. b is a bias of the neuron. f is an activation function of the neuron, and is used to introduce a nonlinear feature into the neural network, to convert an input signal in the neuron into an output signal. The output signal of the activation function may be used as an input of a next convolutional layer. The activation function may be a sigmoid function. The neural network is a network formed by connecting many single neurons together. For example, an output of a neuron may be an input of another neuron. An input of each neuron may be connected to a local receptive field of a previous layer to extract a prediction label of the local receptive field. The local receptive field may be a region including several neurons.

Work at each layer in the neural network may be described by using a mathematical expression y=a(Wx+b) From a physical layer, work at each layer in the neural network may be understood as completing transformation from input space to output space (that is, from row space to column space of a matrix) by performing five operations on the input space (a set of input vectors). The five operations include: 1. dimension increasing/dimension reduction; 2. scaling up/scaling down; 3. rotation; 4. translation; and 5. "bending". The operations 1, 2, and 3 are completed by Wx, the operation 4 is completed by +b, and the operation 5 is implemented by a( ). The word "space" is used herein for expression because a classified object is not a single thing, but a type of things. Space is a collection of all individuals of such type of things. W is a weight vector, and each value in the vector indicates a weight value of one neuron in the neural network at this layer. The vector W determines space transformation from the input space to the output space described above. In other words, a weight W at each layer controls how to transform space. A purpose of training the neural network is to finally obtain a weight matrix (a weight matrix formed by vectors W at a plurality of layers) at all layers in the trained neural network. Therefore, a training process of the neural network is essentially a manner of learning control of space transformation, and more, learning a weight matrix.

Because it is expected that an output of the neural network is as close as possible to a value that is actually expected to be predicted, a current predicted value of the network and an actually expected target value may be compared, and then a weight vector at each layer in the neural network is updated based on a difference between the current predicted value and the target value (where certainly, there is usually an initialization process before the first update, that is, parameters are preconfigured for all layers in the neural network). For example, if the predicted value of the network is large, the weight vector is adjusted to decrease the predicted value, and adjustment is continuously performed, until the neural network can predict the actually expected target value. Therefore, "how to obtain a difference between the predicted value and the target value through comparison" needs to be predefined. This is a loss function or an objective function. The loss function and the objective function are important equations for measuring the difference between the predicted value and the target value. The loss function is used as an example. A higher output value (loss) of the loss function indicates a larger difference. Therefore, training of the neural network is a process of minimizing the loss as much as possible.

(2) Back Propagation Algorithm

In a training process, a neural network may correct a value of a parameter of an initial neural network model by using an error back propagation (BP) algorithm, so that a reconstruction error loss of the neural network model becomes increasingly smaller. For example, an input signal is forward transferred until the error loss is generated in an output, and the parameter of the initial neural network model is updated through back propagation of information about the error loss, to converge the error loss. The back propagation algorithm is an error-loss-centered back propagation motion intended to obtain a parameter, such as a weight matrix, of an optimal neural network model.

(3) Image Semantic Segmentation

Figure 3B:
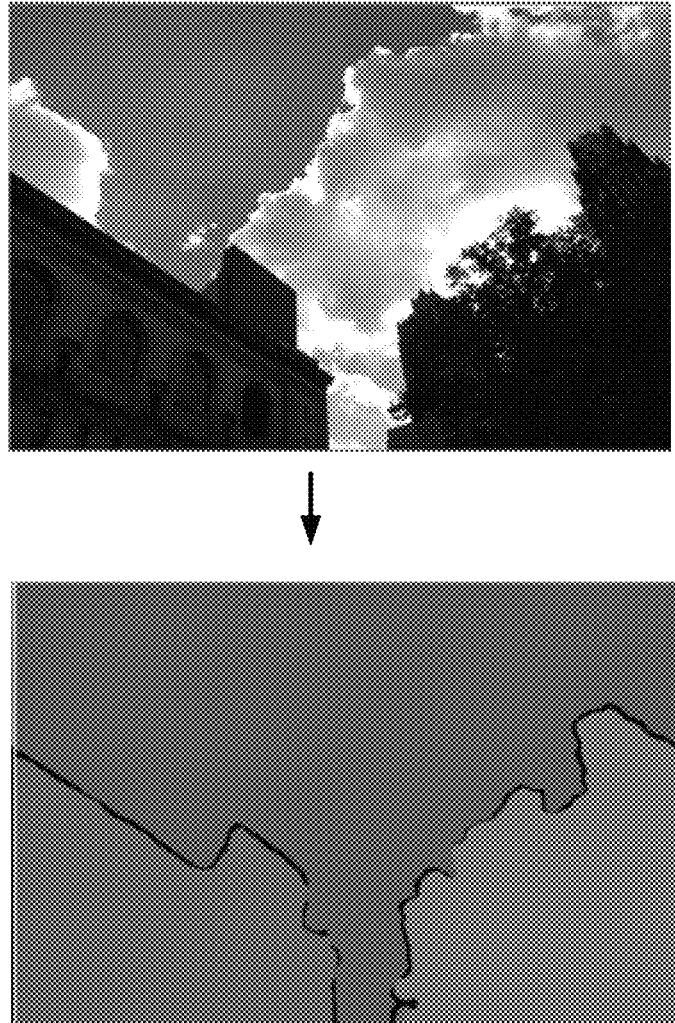
FIG. 3b is a schematic diagram of image semantic segmentation according to an embodiment of this application.

The image semantic segmentation refers to subdividing pixels of an image into different categories according to a rule (for example, an illumination or a category). Briefly, an objective of the image semantic segmentation is to mark each pixel in an image with a label, that is, mark an object category to which each pixel in the image belongs. The labels may include a person, an animal, an automobile, a flower, furniture, and the like. FIG. 3b is a schematic diagram of image semantic segmentation according to an embodiment of this application. As shown in FIG. 3b, an image may be divided into different sub-regions through image semantic segmentation at a pixel level based on a category, for example, sub-regions such as a building, a sky, or a plant.

The following describes the method provided in this application from a neural network training side and a neural network application side.

A model training method provided in embodiments of this application relates to image processing, and may be applied to data processing methods such as data training, machine learning, and deep learning, to perform symbolic and formalized intelligent information modeling, extraction, preprocessing, training, and the like on training data (for example, a source domain image and a target domain image in this application), and finally obtain the trained neural network. After the trained neural network is obtained, the to-be-processed image may be input in the neural network based on an actual requirement, so that the neural network performs image semantic segmentation on the image, to obtain a label of the image, that is, the image is divided into different sub-regions. It may be learned that the model training method provided in embodiments of this application and an application process of the neural network obtained based on the method may be understood as two parts in a system or two phases of an overall process, for example, a model training phase and a model application phase.

Figure 4:
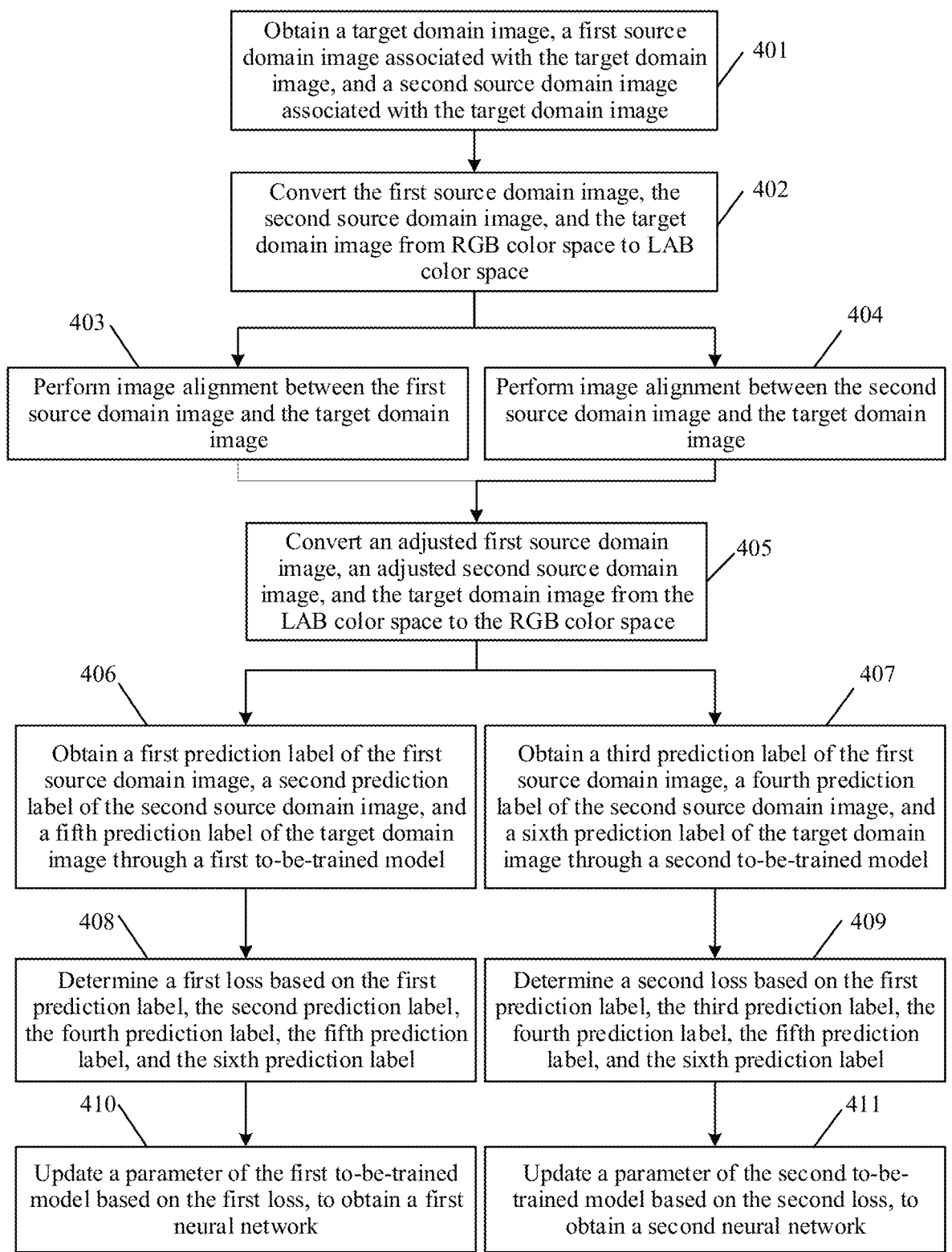
FIG. 4 is a schematic flowchart of a model training method according to an embodiment of this application.

FIG. 4 is a schematic flowchart of a model training method according to an embodiment of this application. As shown in FIG. 4, the method includes the following operations.

401: Obtain a target domain image, a first source domain image associated with the target domain image, and a second source domain image associated with the target domain image.

When a plurality of neural networks used to perform image semantic segmentation need to be trained, a plurality of to-be-trained models, a plurality of source domain images, and the target domain image may be first obtained. The following separately describes the plurality of to-be-trained models, the plurality of source domain images, and the target domain image.

The plurality of to-be-trained models may be neural network models of a same type, or may be neural network models of different types. Any to-be-trained model may be any one of models such as a multi-layer perceptron (MLP), a convolutional neural network (CNN), a recursive neural network (recursive neural network), and a recurrent neural network (RNN). For example, the plurality of to-be-trained models include a first to-be-trained model, a second to-be-trained model, a third to-be-trained model, and the like. The first to-be-trained model, the second to-be-trained model, the third to-be-trained model, and the like may all be MLPs. For another example, the first to-be-trained model is an MLP, the second to-be-trained model is a CNN, the third to-be-trained model is an RNN, and so on. It may be learned that the type of the model is not limited in an embodiment of the application.

The plurality of source domain images are images of a plurality of different source domains. For example, the plurality of source domain images include a first source domain image, a second source domain image, a third source domain image, and the like. The first source domain image belongs to a first source domain, the second source domain image belongs to a second source domain, and the third source domain image belongs to a third source domain. It should be noted that a label of any source domain image is known, that is, in any source domain image, a label of each pixel is known and can be directly obtained.

The target domain image is an image that belongs to a target domain. Because a label of the target domain image is unknown, in a process of training the plurality of to-be-trained models, an objective of a training task is to accurately obtain the label of the target domain image by repeatedly training each to-be-trained model.

It should be noted that the plurality of to-be-trained models are in a one-to-one correspondence with the plurality of source domain images. In this case, one to-be-trained model corresponds to one source domain. Still as in the foregoing example, the first to-be-trained model corresponds to the first source domain image (which is equivalent to that the first to-be-trained model corresponds to the first source domain), the second to-be-trained model corresponds to the second source domain image (which is equivalent to that the second to-be-trained model corresponds to the second source domain), and the third to-be-trained model corresponds to the third source domain image (which is equivalent to that the third to-be-trained model corresponds to the third source domain). Further, each to-be-trained model needs to cooperate with the plurality of source domain images in the training process, to finally determine the label of the target domain image. Therefore, the plurality of source domain images may be considered as images associated with the target domain image, that is, the plurality of source domain images are associated with the target domain image in a same training task.

For ease of description, the following uses the first to-be-trained model and the second to-be-trained model as an example for illustrative description in the plurality of to-be-trained models. In other words, in addition to the first to-be-trained model and the second to-be-trained model, other to-be-trained models also perform subsequent operations. Correspondingly, in the plurality of source domain images, the first source domain image and the second source domain image are also used for illustrative description. Details are not described again subsequently.

402: Convert the first source domain image, the second source domain image, and the target domain image from RGB color space to LAB color space.

403: Perform image alignment between the first source domain image and the target domain image.

404: Perform image alignment between the second source domain image and the target domain image.

405: Convert an adjusted first source domain image, an adjusted second source domain image, and the target domain image from the LAB color space to the RGB color space.

After the first source domain image, the second source domain image, and the target domain image are obtained, because image styles (for example, an image hue and an image illumination) of different images are different, that is, there are distribution differences between the different images, to eliminate an impact of the distribution differences on the training task, image alignment needs to be performed on the first source domain image, the second source domain image, and the target domain image. An image alignment process includes:

Usually, the first source domain image, the second source domain image, and the target domain image that are obtained in operation 401 are all RGB images. Therefore, the first source domain image, the second source domain image, and the target domain image may be first converted from the RGB color space to the LAB color space. It may be understood that a converted first source domain image, a converted second source domain image, and a converted target domain image are LAB images.

Then, in the LAB color space, an average value of the first source domain image, a variance of the first source domain image, an average value of the second source domain image, a variance of the second source domain image, an average value of the target domain image, and a variance of the target domain image are obtained. Next, the first source domain image is adjusted based on the average value of the first source domain image, the variance of the first source domain image, the average value of the target domain image, and the variance of the target domain image, and the second source domain image is adjusted based on the average value of the second source domain image, the variance of the second source domain image, the average value of the target domain image, and the variance of the target domain image. The adjustment operation may be implemented based on the formula (2):

$$\hat{X}_S^{LAB} = \frac{X_S^{LAB} - \mu_S}{\sigma_S} * \sigma_T + \mu_T \tag{2}$$

In the foregoing formula, $$X_S^{LAB}$$

is the source domain image, $$\hat{X}_S^{LAB}$$

is the adjusted source domain image, $\mu_s$ is the average value of the source domain image, $\sigma_s$ is the variance of the source domain image, $\mu_T$ is the average value of the target domain image, and $\sigma_T$ is the variance of the target domain image.

In this way, both the adjusted first source domain image and the adjusted second source domain image may be aligned to the target domain image. After the adjusted first source domain image and the adjusted second source domain image are obtained, the adjusted first source domain image, the adjusted second source domain image, and the target domain image may be converted from the LAB color space to the RGB color space. It may be understood that a converted first source domain image, a converted second source domain image, and a converted target domain image are RGB images.

In addition, the foregoing image alignment operation may alternatively be performed on other source domain images. Details are not described herein again. After the image alignment operation is performed on all source domain images, all adjusted source domain images may be aligned to the target domain image. In this case, the image style of the source domain image may become closer to the image style of the target domain image, to reduce a distribution difference between the source domain images and a distribution difference between the source domain image and the target domain image.

406: Obtain a first prediction label of the first source domain image, a second prediction label of the second source domain image, and a fifth prediction label of the target domain image through the first to-be-trained model.

After the image alignment, the first source domain image, the second source domain image, and the target domain image may be input in the first to-be-trained model, so that the first to-be-trained model performs feature extraction on the first source domain image, the second source domain image, and the target domain image, to obtain the first prediction label of the first source domain image, the second prediction label of the second source domain image, and the fifth prediction label of the target domain image. The first prediction label is a prediction label of the first to-be-trained model for the first source domain image, the second prediction label is a prediction label of the first to-be-trained model for the second source domain image, and the fifth prediction label is a prediction label of the first to-be-trained model for the target domain image.

407: Obtain a third prediction label of the first source domain image, a fourth prediction label of the second source domain image, and a sixth prediction label of the target domain image through the second to-be-trained model.

After the image alignment, the first source domain image, the second source domain image, and the target domain image may be input in the second to-be-trained model, so that the second to-be-trained model performs feature extraction on the first source domain image, the second source domain image, and the target domain image, to obtain the third prediction label of the first source domain image, the fourth prediction label of the second source domain image, and the sixth prediction label of the target domain image. The third prediction label is a prediction label of the second to-be-trained model for the first source domain image, the fourth prediction label is a prediction label of the second to-be-trained model for the second source domain image, and the sixth prediction label is a prediction label of the second to-be-trained model for the target domain image.

408: Determine a first loss based on the first prediction label, the second prediction label, the fourth prediction label, the fifth prediction label, and the sixth prediction label.

After the first prediction label, the second prediction label, the third prediction label, the fourth prediction label, the fifth prediction label, and the sixth prediction label are obtained, the first loss may be determined based on the first prediction label, the second prediction label, the fourth prediction label, the fifth prediction label, and the sixth prediction label. For example, a label of the first source domain image may be first obtained, and a first subloss is determined based on the first prediction label (namely, the prediction label of the first to-be-trained model for the first source domain image) and the label of the first source domain image (a real label of the first source domain image, which is known and can be directly obtained). The first subloss may be determined by using a cross-entropy loss function, that is, determined by using the formula (3):

$$L_{Si}^{seg}\left(F_{Mi}^{Si}, Y_{Si}\right) = -\frac{1}{|x_{Si}|}\sum_{h,w}\sum_{c\in C}Y_{Si}^{(h,w,c)}\log\left(\sigma\left(F_{Mi}^{Si(h,w,c)}\right)\right) \quad (3)$$

In the foregoing formula, $Y_{Si}$ is a label of an $i^{th}$ source domain image, Si is the $i^{th}$ source domain image, Mi is an $i^{th}$ to-be-trained model, $$F_{Mi}^{Si}$$

is a prediction label of the $i^{th}$ to-be-trained model for the $i^{th}$ source domain image, $x_{Si}$ is a value (or a data volume) of the $i^{th}$ source domain image, h is a width, w is a width, c is a channel, C is a total quantity of channels, i=1, 2, 3, . . . , or N, and N is a total quantity of source domain images. It should be noted that c is a variable, and C is a constant, that is, a minimum value of c is 1, and a maximum value of c is C. h and w are understood in a similar way. Details are not described here again.

Next, a second subloss is determined based on the second prediction label (namely, the prediction label of the first to-be-trained model for the second source domain image) and the fourth prediction label (namely, the prediction label of the second to-be-trained model for the second source domain image). The second subloss may be determined by using a relative-entropy loss function, that is, determined by using the formula (4) and the formula (5):

$$L_{S}^{coi}\left(\left(F_{Mi}^{Sj}, F_{Mj}^{Sj}\right)_{j\neq i}\right) = \frac{1}{N-1}\sum_{j,j\neq i}L_{j\rightarrow i}^{kl}\left(F_{Mi}^{Sj}, F_{Mj}^{Sj}\right); \text{and} \quad (4)$$

$$L_{j\rightarrow i}^{kl}\left(F_{Mi}^{Sj}, F_{Mj}^{Sj}\right) = -\frac{1}{|x_{Sj}|}\sum\sum\sigma\left(F_{Mi}^{Sj}\right)\log\left(\frac{\sigma\left(F_{Mj}^{Sj}\right)}{\sigma\left(F_{Mi}^{Sj}\right)}\right) \quad (5)$$

In the foregoing formulas, $$F_{Mi}^{Sj}$$

is a prediction label of an $i^{th}$ to-be-trained model for a $j^{th}$ source domain image, $$F_{Mj}^{Sj}$$

is a prediction label of a $j^{th}$ to-be-trained model for the $j^{th}$ source domain image, i≠j, j=1, 2, 3, . . . , or N, and $x_{Sj}$ is a value of an $i^{th}$ source domain image. It may be understood that, when the second subloss is computed, not only the prediction label of the first to-be-trained model for the second source domain image is related, but also a prediction label of the first to-be-trained model for the third source domain image, a prediction label of the first to-be-trained model for a fourth source domain image, and the like are related. Similarly, when the second subloss is computed, not only the prediction label of the second to-be-trained model for the second source domain image, but also a prediction label of the third to-be-trained model for the third source domain image, a prediction label of a fourth to-be-trained model for the fourth source domain image, and the like are related. Details are not described again subsequently.

Then, the label (namely, a pseudo label of the target domain image) of the target domain image is determined based on the fifth prediction label (namely, the prediction label of the first to-be-trained model for the target domain image) and the sixth prediction label (namely, the prediction label of the second to-be-trained model for the target domain image). The label of the target domain image may be determined by using the formula (6) to the formula (8):

$$\hat{P} = \sigma\left(\frac{1}{N}\sum_{i}F_{Mi}^{T}\right); \quad (6)$$

-continued $$\hat{y} \leftarrow \text{argmax}(\hat{P}, dim = 1), \hat{y} \in R^{H \times W}; \text{and} \qquad (7)$$

$$\text{for } c \leftarrow 1 \text{ to } C \text{ do} \qquad (8)$$

$$\hat{P}_c \leftarrow \text{sort} (\hat{P}_{\{c, \bullet, \bullet\}}, \text{order} = \text{Descending}$$

$$n_c \leftarrow \text{sum}(\hat{y} == c)$$

$$t \leftarrow \min(\hat{P}_c[n_c \times \alpha], \tau)$$

$$mask1 \leftarrow \hat{y} == c$$

$$mask2 \leftarrow \hat{P}_{\{c, \bullet, \bullet\}} \leq t$$

$$\hat{y}[mask1, mask2] \leftarrow l_{ig}$$

$$\text{end}$$

In the foregoing formulas, $$F_{Mi}^T \qquad 20$$

is a prediction label of an $i^{th}$ to-be-trained model for the target domain image, $\hat{P}$ is an intermediate vector, $\hat{P} \in R^{C \times H \times W}$ (that is, $\hat{P}$ is a three-dimensional vector), and $\alpha$, $\tau$, and $I_{ig}$ are all preset parameters. It may be understood that when $\hat{P}$ is computed, not only the prediction label of the first to-be-trained model for the target domain image and the prediction label of the second to-be-trained model for the target domain image are related, but also the prediction label of the third to-be-trained model for the target domain image, the prediction label of the fourth to-be-trained model for the target domain image, and the like are related. Details are not described again subsequently.

The formula (7) may be understood as converting $\hat{P}$ from a three-dimensional vector to a two-dimensional vector $\hat{y}$, where a value range of a value in an H dimension and a value in a W dimension of $\hat{y}$ is [1, C].

The formula (8) may be understood as performing C iterations on operation 1 to operation 6, where a current iteration is c. Operation 1: Construct $\hat{P}_c$ based on all values in a C dimension of $\hat{P}$. Operation 2: Sum up all values that are equal to c in $\hat{y}$ to obtain $n_c$. Operation 3: Select a small value between an $n_c \times \alpha$th value in $\hat{P}_c$ and $\tau$ as t. Operation 4: Use all values that are equal to c in $\hat{y}$ as mask1. Operation 5: Use a value that is in a C dimension of $\hat{P}$ and that is less than or equal to t as mask2. Operation 6: Assign $I_{ig}$ to all values in mask1 and mask2, to obtain a new $\hat{y}$, namely, the label of the target domain image.

Subsequently, a fifth subloss may be determined based on the label of the target domain image and the fifth prediction label. The fifth subloss may be determined by using a cross-entropy loss function or a relative-entropy loss function. The following uses the cross-entropy loss function for illustrative description. The fifth loss may be determined by using the formula (9):

$$L_T^{col}(F_{Mi}^T, \hat{y}) = -\frac{1}{|x_T|} \sum_{h,w} \sum_c \hat{y}^{(h,w,c)} \log(\sigma(F_{Mi}^{T(h,w,c)})) \qquad (9)$$

In the foregoing formula, $x_T$ is a value of the target domain image.

Finally, a loss used to update the parameter of the first to-be-trained model, namely, the first loss, may be determined based on the first subloss, the second subloss, and the fifth subloss. The first loss may be determined by using the formula (10):

$$L_i = L_{Si}^{seg}(F_{Mi}^{Si}, Y_{Si}) + \lambda_S^{col} L_S^{col}((F_{Mi}^{Sj}, F_{Mj}^{Sj})_{j \neq i}) + \frac{cur - it}{\max - its} \lambda_T^{col} L_T^{col}(F_{Mi}^T, \hat{y}) \qquad (10)$$

In the foregoing formula, $L_i$ is a loss used to update a parameter of an $i^{th}$ to-be-trained model, $$\lambda_S^{col}$$

and $$\lambda_T^{col}$$

are preset parameters, and $$\frac{cur - it}{\max - its}$$

is a ratio of a current quantity of training times to a total quantity of training times.

409: Determine a second loss based on the first prediction label, the third prediction label, the fourth prediction label, the fifth prediction label, and the sixth prediction label.

After the first prediction label, the second prediction label, the third prediction label, the fourth prediction label, the fifth prediction label, and the sixth prediction label are obtained, the second loss may be determined based on the first prediction label, the third prediction label, the fourth prediction label, the fifth prediction label, and the sixth prediction label.

For example, a label of the second source domain image may be first obtained, and a third subloss is determined based on the fourth prediction label (namely, the prediction label of the second to-be-trained model for the second source domain image) and the label of the second source domain image. For a process of determining the third subloss, refer to the foregoing process of determining the first subloss. Details are not described herein again.

Then, a fourth subloss may be determined based on the first prediction label (namely, the prediction label of the first to-be-trained model for the first source domain image) and the third prediction label (namely, the prediction label of the second to-be-trained model for the first source domain image). For a process of determining the fourth subloss, refer to the foregoing process of determining the second subloss. Details are not described herein again.

Subsequently, a sixth subloss may be determined based on the sixth prediction label and the label of the target domain image. For a process of determining the sixth subloss, refer to the foregoing process of determining the fifth subloss. Details are not described herein again.

Finally, a loss used to update the parameter of the second to-be-trained model, namely, the second loss, may be determined based on the third subloss, the fourth subloss, and the sixth subloss. For a process of determining the second loss, refer to the foregoing process of determining the first loss. Details are not described herein again.

In addition, based on the processes described in operation 406 and operation 408, a loss used to update parameters of the other to-be-trained models, namely, a third loss used to update a parameter of the third to-be-trained model, a fourth loss used to update a parameter of the third to-be-trained model, or the like, may be further determined. Details are not described herein again.

410: Update the parameter of the first to-be-trained model based on the first loss, to obtain a first neural network.

411: Update the parameter of the second to-be-trained model based on the second loss, to obtain a second neural network.

After the first loss and the second loss are obtained, the parameter of the first to-be-trained model may be updated based on the first loss until a model training condition is met (for example, when the first loss reaches convergence), to obtain the first neural network. Similarly, the parameter of the second to-be-trained model may be updated based on the second loss until the model training condition is met, to obtain the second neural network. In addition, the parameters of the other to-be-trained models may also be updated by using the other losses until the model training condition is met, to obtain other neural networks. In this way, a plurality of neural networks used to perform image semantic segmentation may be obtained.

In an embodiment of the application, after the first source domain image and the second source domain image that are associated with the target domain image are obtained, the first prediction label of the first source domain image and the second prediction label of the second source domain image may be obtained through the first to-be-trained model, and the third prediction label of the first source domain image and the fourth prediction label of the second source domain image may be obtained through the second to-be-trained model. Then, the first loss is determined based on the first prediction label, the second prediction label, and the fourth prediction label, and the second loss is determined based on the first prediction label, the third prediction label, and the fourth prediction label. In the process of determining the first loss, the relationship between the first prediction label and the second prediction label (namely, the relationship between the plurality of source domain images) obtained through the first to-be-trained model is considered. On this basis, the impact (namely, the relationship between the plurality of models) caused by the fourth prediction label obtained through the second to-be-trained model is further considered. Similarly, in the process of determining the second loss, the relationship between the plurality of source domain images and the relationship between the plurality of models are also considered. Because the factors are comprehensively considered, the first neural network obtained by performing parameter update based on the first loss and the second neural network obtained by performing parameter update based on the second loss have a strong generalization capability.

Figure 5:
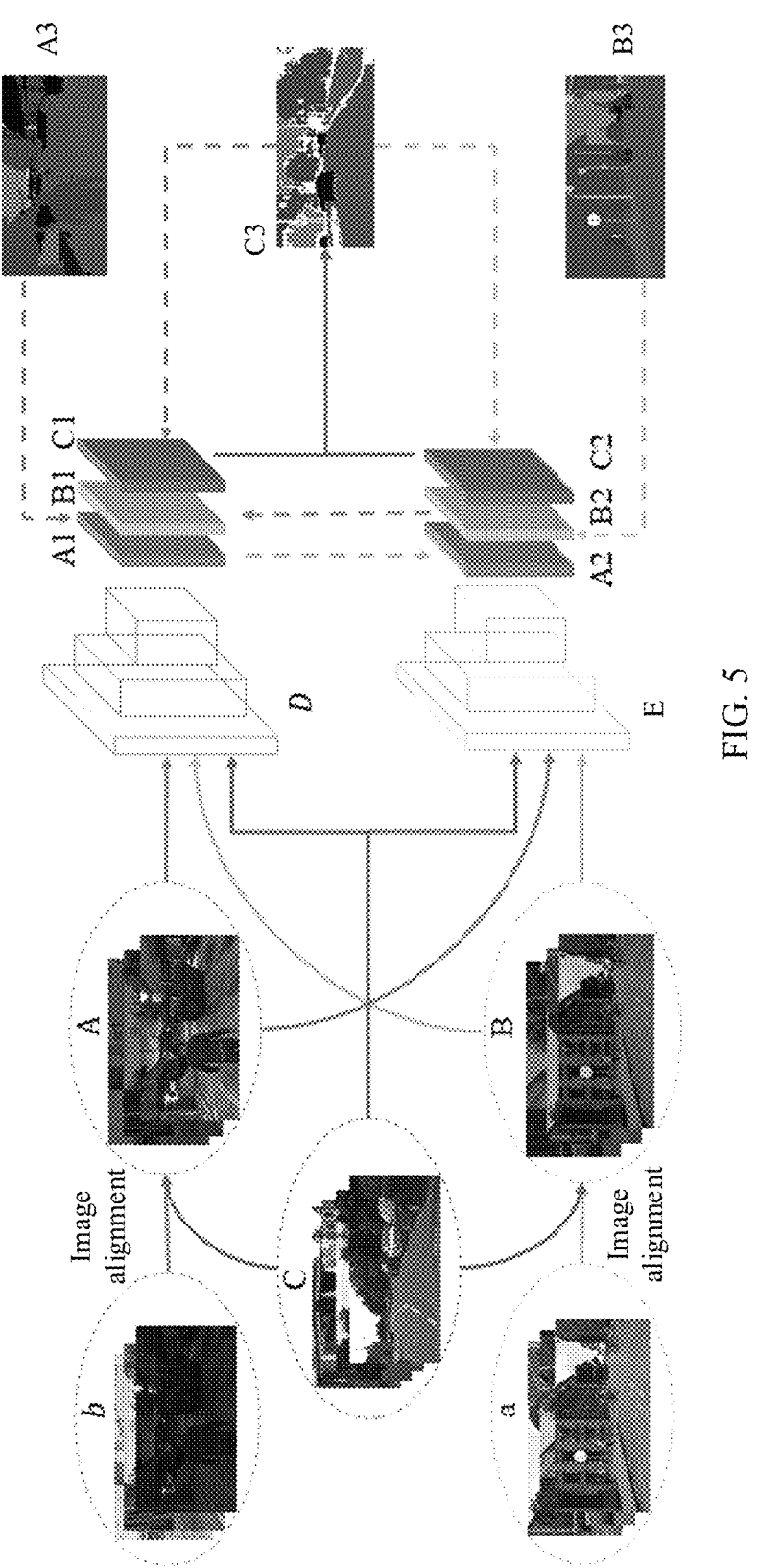
FIG. 5 is a schematic diagram of an application example of a model training method according to an embodiment of this application.

To further understand the solutions, the following further describes, with reference to an application example, the image processing method provided in embodiments of this application. FIG. 5 is a schematic diagram of an application example of a model training method according to an embodiment of this application. As shown in FIG. 5, the application example includes: It is assumed that there are a source domain image a, a source domain image b, a target domain image C, a to-be-trained model D corresponding to the source domain image a, and a to-be-trained model E corresponding to the source domain image b.

After image alignment is performed between the source domain image a and the target domain image C, a source domain image A aligned with the target domain image C may be obtained. Similarly, image alignment may be performed between the source domain image b and the target domain image C, to obtain a source domain image B aligned with the target domain image C.

Then, a prediction label A1 of the source domain image A, a prediction label B1 of the source domain image B, and a prediction label C1 of the target domain image C are obtained through the to-be-trained model D, and a prediction label A2 of the source domain image A, a prediction label B2 of the source domain image B, and a prediction label C2 of the target domain image C are obtained through the to-be-trained model E.

Next, a label A3 of the source domain image a and a label B3 of the source domain image b may be obtained, and a label C3 of the target domain image C may be determined based on the prediction label C1 and the prediction label C2. Closely followed, a loss used to update a parameter of the to-be-trained model D may be determined based on the prediction label A1, the prediction label B1, the prediction label C1, the prediction label B2, the label A3, and the label C3, and a loss used to update a parameter of the to-be-trained model D may be determined based on the prediction label A2, the prediction label B2, the prediction label C2, the prediction label A1, the label B3, and the label C3.

Finally, the parameter of the to-be-trained model D and the parameter of the to-be-trained model D are updated based on obtained loss values, until a model training condition is met, to obtain a neural network used to perform image semantic segmentation.

In addition, to further prove performance of the neural network obtained by using the model training method provided in an embodiment of the application, the neural network obtained by using the model training method provided in an embodiment of the application may be compared with neural networks obtained by using other model training methods. A comparison result is shown in Table 1.

TABLE 1

| Method | Method 1 | Method 2 | Method 3 | Method 4 | Method 5 |
|--------|----------|----------|----------|----------|----------|
| Score | 51.59 | 54.38 | 54.03 | 56.03 | 58.33 |

It should be noted that training samples (namely, the source domain image and the target domain image) used in the foregoing methods are the same. The foregoing score is a score obtained when image semantic segmentation is performed on an image through a neural network obtained by using each method (that is, whether each pixel is correctly classified). The method 1 is a method described in the background, the method 2 is a method combining a method described in the background and an image alignment technology, the method 3 is a method combining an image alignment technology and target domain collaborative learning, the method 4 is a method combining an image alignment technology and source domain collaborative learning, and the method 5 is the method provided in an embodiment of the application, that is, a method combining an image alignment technology, source domain collaborative learning, and target domain collaborative learning. It may be learned that performance of the neural network obtained by using the model training method provided in an embodiment of the application is optimal.

Further, more neural networks obtained through training by using other methods may be obtained, and compared with the neural network obtained through the model training method provided in an embodiment of the application, to score whether types of objects in the image is correctly classified through the neural network. A score result is shown in Table 2.

domain image may be obtained through the first to-be-trained model. Then, the first loss is determined based on the first prediction label and the second prediction label. In a process of determining the first loss, a relationship between the first prediction label and the second prediction label (namely, a relationship between a plurality of source domain images) obtained through the first to-be-trained model is

TABLE 2

| | Method 6 | Method 7 | Method 8 | Method 9 | Method 10 | Method 11 | Embodiment of this application |
|---|---|---|---|---|---|---|---|
| Road | 85.1 | 89.3 | 91.8 | 92.4 | 94.1 | 94.2 | 93.6 |
| Sidewalk | 36.9 | 47.3 | 49.0 | 56.1 | 61.0 | 61.8 | 59.6 |
| Building | 84.1 | 83.6 | 84.6 | 86.8 | 86.4 | 86.7 | 87.1 |
| Wall | 39.0 | 40.9 | 39.4 | 42.4 | 43.3 | 47.7 | 44.9 |
| Fence | 33.3 | 27.8 | 31.5 | 32.9 | 32.1 | 34.1 | 36.7 |
| Pole | 38.7 | 39.0 | 39.9 | 39.3 | 40.6 | 39.3 | 42.1 |
| Light | 43.1 | 44.2 | 42.9 | 48.0 | 49.0 | 44.6 | 49.9 |
| Sign | 40.2 | 42.5 | 43.5 | 40.3 | 44.4 | 34.2 | 42.5 |
| Vegetable | 84.8 | 86.7 | 86.3 | 87.2 | 87.3 | 87.2 | 87.7 |
| Terrain | 37.1 | 45.5 | 45.1 | 47.2 | 47.7 | 49.6 | 47.6 |
| Sky | 82.4 | 84.5 | 84.6 | 90.5 | 89.4 | 89.7 | 89.9 |
| Person | 65.2 | 63.1 | 65.3 | 64.1 | 61.7 | 65.6 | 63.5 |
| Rider | 37.8 | 38.0 | 41.0 | 35.9 | 36.3 | 38.1 | 40.3 |
| Car | 69.4 | 79.4 | 87.1 | 87.8 | 87.5 | 88.2 | 88.2 |
| Truck | 43.4 | 34.9 | 37.9 | 33.8 | 35.5 | 48.1 | 41.0 |
| Bus | 38.8 | 48.3 | 49.2 | 48.6 | 45.8 | 63.0 | 58.3 |
| Train | 34.6 | 42.1 | 31.0 | 39.0 | 31.0 | 41.9 | 53.1 |
| Motorbike | 33.2 | 30.7 | 30.3 | 27.6 | 33.5 | 39.2 | 37.9 |
| Bike | 53.1 | 52.3 | 48.8 | 49.2 | 52.1 | 59.2 | 57.7 |
| Integrated score | 51.6 | 53.7 | 54.2 | 55.2 | 55.7 | 58.6 | 59.0 |

It should be noted that training samples (namely, the source domain image and the target domain image) used in the foregoing methods are the same. The method 6 to the method 11 are conventional methods. It may be learned by comparing scores that performance of the neural network obtained by using the model training method provided in an embodiment of the application is optimal.

Figure 6:
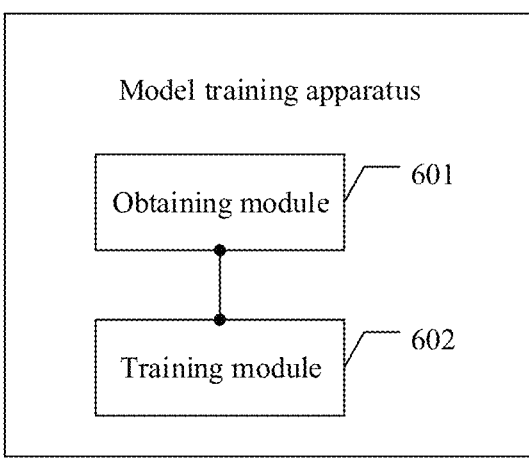
FIG. 6 is a schematic diagram of a structure of a model training apparatus according to an embodiment of this application.

The foregoing describes in detail the model training method provided in embodiments of this application. The following describes a model training apparatus provided in embodiments of this application. FIG. 6 is a schematic diagram of a structure of a model training apparatus according to an embodiment of this application. As shown in FIG. 6, the apparatus includes:

an obtaining module 601, configured to obtain a first source domain image associated with a target domain image and a second source domain image associated with the target domain image; and a training module 602, configured to obtain a first prediction label of the first source domain image and a second prediction label of the second source domain image through a first to-be-trained model, where the training module 602 is further configured to obtain a first loss based on the first prediction label and the second prediction label, where the first loss indicates a difference between the first prediction label and the second prediction label; and the training module 602 is further configured to update a parameter of the first to-be-trained model based on the first loss, to obtain a first neural network.

It may be learned from the foregoing apparatus that, after the first source domain image and the second source domain image that are associated with the target domain image are obtained, the first prediction label of the first source domain image and the second prediction label of the second source domain image may be obtained through the first source considered. Because factors are comprehensively considered, the first neural network obtained by performing parameter update based on the first loss has a strong generalization capability.

In an embodiment, the training module 602 is further configured to obtain a third prediction label of the first source domain image and a fourth prediction label of the second source domain image through a second to-be-trained model; and the training module 602 is configured to obtain the first loss based on the first prediction label, the second prediction label, and the fourth prediction label.

In an embodiment, the training module 602 is further configured to: obtain a second loss based on the first prediction label, the third prediction label, and the fourth prediction label; and update a parameter of the second to-be-trained model based on the second loss, to obtain a second neural network.

In an embodiment, the training module 602 is configured to: obtain a label of the first source domain image; obtain a first subloss based on the first prediction label and the label of the first source domain image, where the first subloss indicates a difference between the first prediction label and the label of the first source domain image; obtain a second subloss based on the second prediction label and the fourth prediction label, where the second subloss indicates a difference between the second prediction label and the fourth prediction label; and perform summation based on the first subloss and the second subloss, to obtain the first loss.

In an embodiment, the training module 602 is configured to: obtain a label of the second source domain image; obtain a third subloss based on the fourth prediction label and the label of the second source domain image, where the third subloss indicates a difference between the fourth prediction label and the label of the second source domain image; obtain a fourth subloss based on the first prediction label and the third prediction label, where the fourth subloss indicates a difference between the first prediction label and the third prediction label; and perform summation based on the third subloss and the fourth subloss, to obtain the second loss.

In an embodiment, the training module 602 is further configured to: obtain a fifth prediction label of the target domain image through the first to-be-trained model, and obtain a sixth prediction label of the target domain image through the second to-be-trained model; obtain a label of the target domain image based on the fifth prediction label and the sixth prediction label; and obtain a fifth subloss based on the fifth prediction label and the label of the target domain image, where the fifth subloss indicates a difference between the fifth prediction label and the label of the target domain image; and the training module 602 is configured to perform summation based on the first subloss, the second subloss, and the fifth subloss, to obtain the first loss.

In an embodiment, the training module 602 is further configured to: obtain a sixth subloss based on the sixth prediction label and the label of the target domain image, where the sixth subloss indicates a difference between the sixth prediction label and the label of the target domain image; and the training module 602 is configured to perform summation based on the third subloss, the fourth subloss, and the sixth subloss, to obtain the second loss.

In an embodiment, the first subloss and the third subloss are cross-entropy losses.

In an embodiment, the second subloss and the fourth subloss are relative-entropy losses.

In an embodiment, the fifth subloss and the sixth subloss are cross-entropy losses or relative-entropy losses.

In an embodiment, the obtaining module 601 is further configured to: convert the first source domain image, the second source domain image, and the target domain image from RGB color space to LAB color space; obtain, in the LAB color space, an average value of the first source domain image, a variance of the first source domain image, an average value of the second source domain image, a variance of the second source domain image, an average value of the target domain image, and a variance of the target domain image; adjust the first source domain image based on the average value of the first source domain image, the variance of the first source domain image, the average value of the target domain image, and the variance of the target domain image; adjust the second source domain image based on the average value of the second source domain image, the variance of the second source domain image, the average value of the target domain image, and the variance of the target domain image; and convert an adjusted first source domain image, an adjusted second source domain image, and the target domain image from the LAB color space to the RGB color space.

It should be noted that content such as information exchange between the modules/units of the apparatus and the execution processes thereof is based on the same idea as that of the method embodiments of this application, and produces the same technical effects as that of the method embodiments of this application. For content, refer to the foregoing descriptions in the method embodiments of this application. Details are not described herein again.

Figure 7:
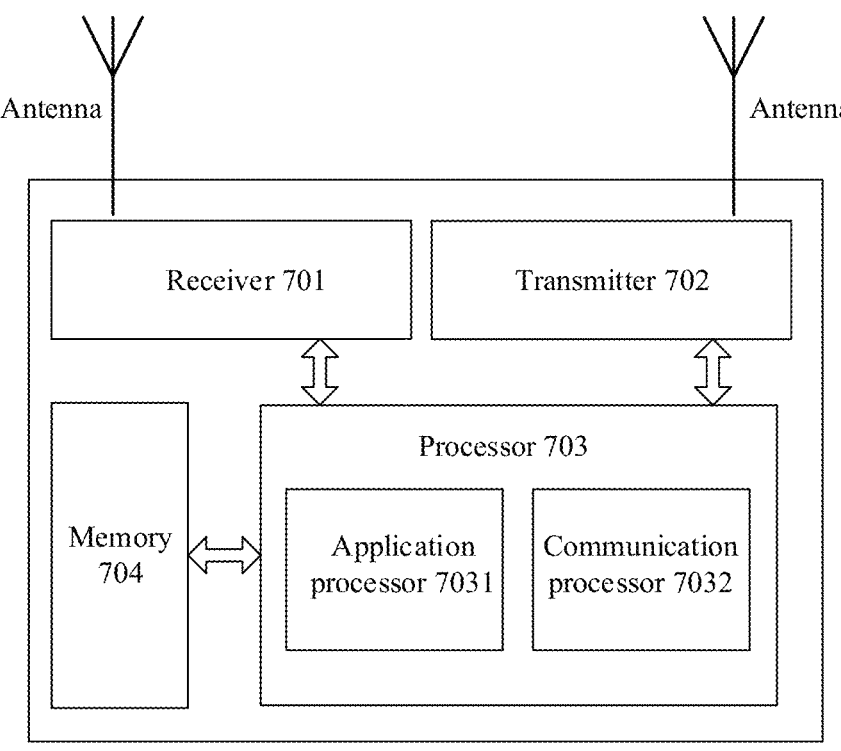
FIG. 7 is a schematic diagram of a structure of an execution device according to an embodiment of this application.

An embodiment of this application further relates to an execution device. FIG. 7 is a schematic diagram of a structure of an execution device according to an embodiment of this application. As shown in FIG. 7, the execution device 700 may be represented as a mobile phone, a tablet computer, a laptop computer, an intelligent wearable device, a server, and the like. This is not limited herein. The execution device 700 may perform image semantic segmentation on an image through the neural network obtained in the embodiment corresponding to FIG. 4. For example, the execution device 700 includes a receiver 701, a transmitter 702, a processor 703, and a memory 704 (where there may be one or more processors 703 in the execution device 700, and one processor is used as an example in FIG. 7). The processor 703 may include an application processor 7031 and a communication processor 7032. In some embodiments of this application, the receiver 701, the transmitter 702, the processor 703, and the memory 704 may be connected through a bus or in another manner.

The memory 704 may include a read-only memory and a random access memory, and provide instructions and data for the processor 703. A part of the memory 704 may further include a non-volatile random access memory (NVRAM). The memory 704 stores a processor and operation instructions, an executable module or a data structure, a subnet thereof, or an expanded set thereof. The operation instructions may include various operation instructions, to implement various operations.

The processor 703 controls an operation of the execution device. During application, various components of the execution device are coupled together through a bus system. In addition to a data bus, the bus system may further include a power bus, a control bus, a status signal bus, and the like. However, for clear description, various types of buses in the figure are referred to as the bus system.

The method disclosed in embodiments of this application may be applied to the processor 703, or may be implemented by the processor 703. The processor 703 may be an integrated circuit chip, and has a signal processing capability. In an implementation process, operations in the methods may be implemented through an integrated logic circuit of hardware in the processor 703, or by using instructions in a form of software. The processor 703 may be a general-purpose processor, a digital signal processor (DSP), a microprocessor, or a microcontroller. The processor 703 may further include an application-specific integrated circuit (ASIC), a field programmable gate array (FPGA) or another programmable logic device, a discrete gate or a transistor logic device, or a discrete hardware component. The processor 703 may implement or perform the methods, the operations, and the logical block diagrams disclosed in embodiments of this application. The general-purpose processor may be a microprocessor, or the processor may be any conventional processor or the like. The operations in the methods disclosed with reference to embodiments of this application may be directly performed and completed by a hardware decoding processor, or may be performed and completed by a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory 704, and the processor 703 reads information in the memory 704 and completes the operations in the foregoing methods in combination with hardware of the processor 703.

The receiver 701 may be configured to receive input digit or character information, and generate a signal input related to related setting and function control of the execution device. The transmitter 702 may be configured to output the digital or character information through a first interface. The transmitter 702 may further be configured to send instructions to a disk group through the first interface, to modify data in the disk group. The transmitter 702 may further include a display device such as a display.

In an embodiment of the application, in a case, the processor 703 is configured to perform image semantic segmentation on the image through the neural network obtained in the embodiment corresponding to FIG. 4.

Figure 8:
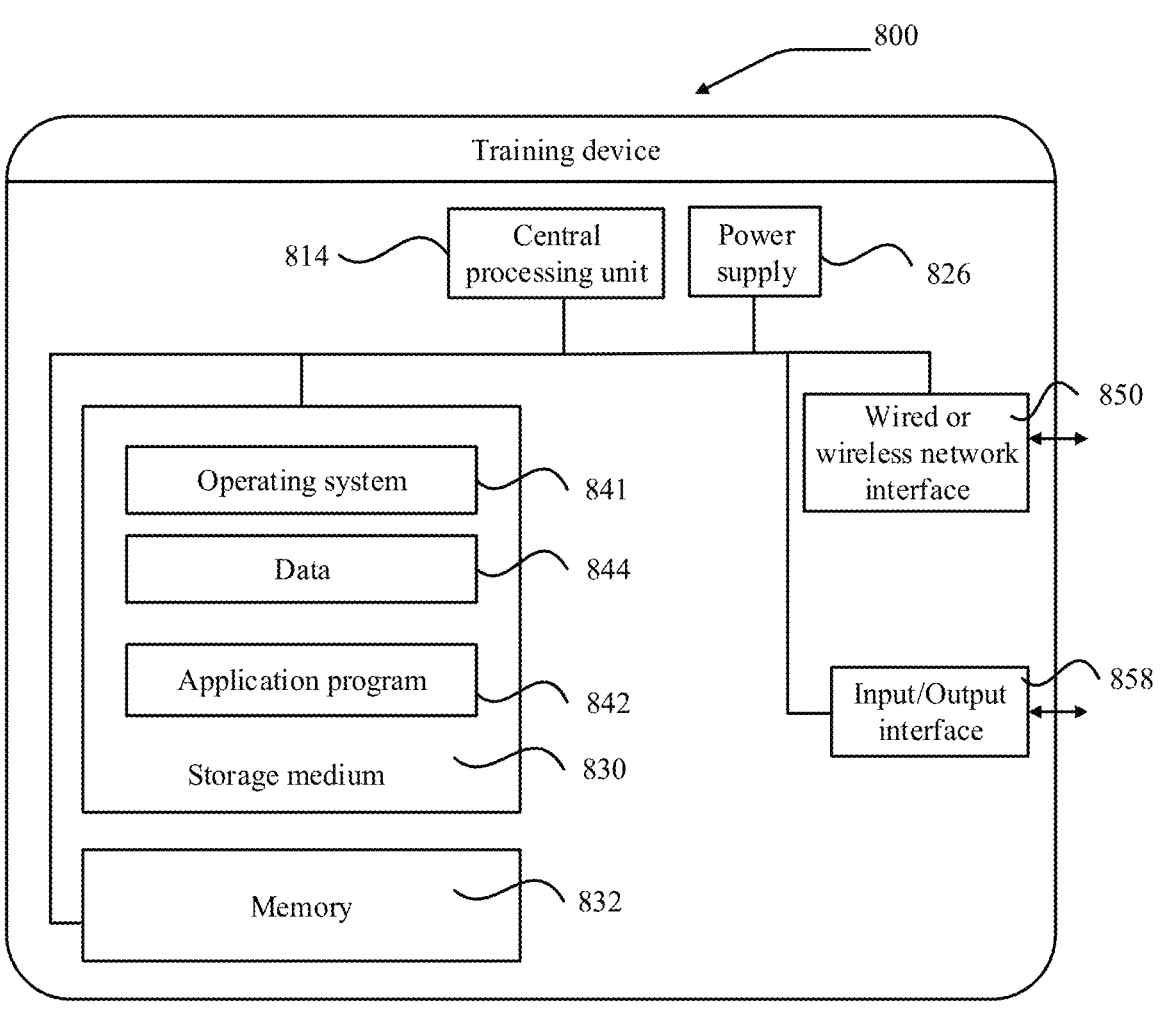
FIG. 8 is a schematic diagram of a structure of a training device according to an embodiment of this application.

An embodiment of this application further relates to a training device. FIG. 8 is a schematic diagram of a structure of a training device according to an embodiment of this application. As shown in FIG. 8, the training device 800 is implemented by one or more servers. The training device 800 may differ greatly due to different configurations or performance, and may include one or more central processing units (CPUs) 814 (for example, one or more processors) and a memory 832, and one or more storage media 830 (for example, one or more massive storage devices) that store an application program 842 or data 844. The memory 832 and the storage medium 830 may perform transitory storage or persistent storage. A program stored in the storage medium 830 may include one or more modules (not shown in the figure), and each module may include a series of instruction operations on the training device. Further, the central processing unit 814 may be configured to: communicate with the storage medium 830, and perform the series of instruction operations in the storage medium 830 on the training device 800.

The training device 800 may further include one or more power supplies 826, one or more wired or wireless network interfaces 850, one or more input/output interfaces 858, or one or more operating systems 841, such as Windows Server™, Mac OS X™, Unix™, Linux™ and FreeBSD™.

For example, the training device may perform the model training method in the embodiment corresponding to FIG. 4.

An embodiment of this application further relates to a computer-readable storage medium. The computer-readable storage medium stores a program used for signal processing. When the program is run on a computer, the computer is enabled to perform operations performed by the execution device, or the computer is enabled to perform operations performed by the training device.

An embodiment of this application further relates to a computer program product. The computer program product stores instructions. When the instructions are executed by a computer, the computer is enabled to perform operations performed by the execution device, or the computer is enabled to perform operations performed by the training device.

The execution device, the training device, or the terminal device in embodiments of this application may be a chip. The chip includes a processing unit and a communication unit. The processing unit may be, for example, a processor, and the communication unit may be, for example, an input/ output interface, a pin, or a circuit. The processing unit may execute computer-executable instructions stored in a storage unit, so that a chip in the execution device performs the data processing method described in the embodiments, or a chip in the training device performs the data processing method described in the embodiments. In an embodiment, the storage unit is a storage unit in the chip, for example, a register or a buffer. Alternatively, the storage unit may be a storage unit in a wireless access device but outside the chip, for example, a read-only memory (ROM), another type of static storage device that can store static information and instructions, or a random access memory (RAM).

Figure 9:
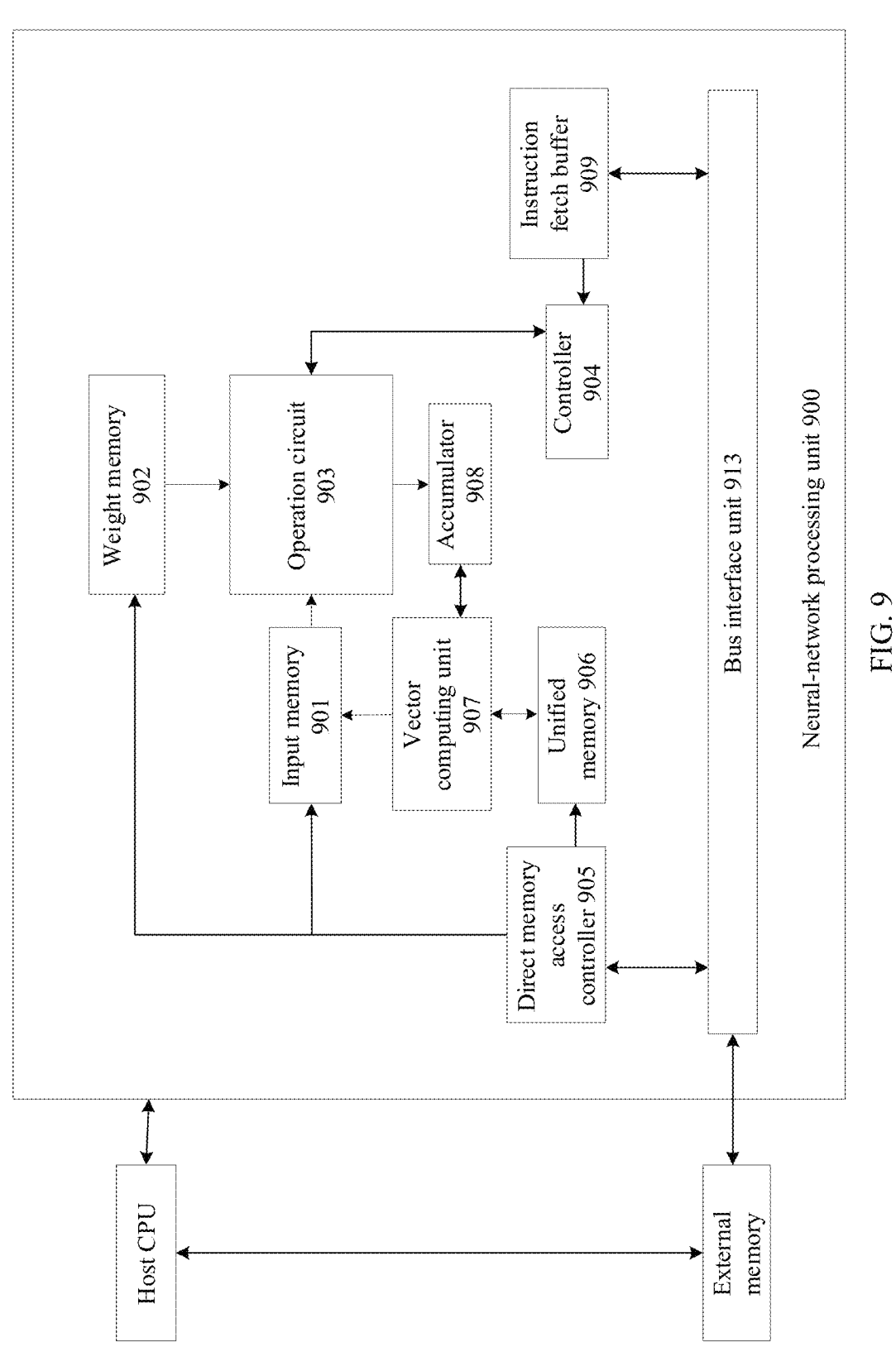
FIG. 9 is a schematic diagram of a structure of a chip according to an embodiment of this application.

For example, FIG. 9 is a schematic diagram of a structure of a chip according to an embodiment of this application. The chip may be represented as a neural-network processing unit NPU 900. The NPU 900 is mounted to a host CPU as a coprocessor. The host CPU allocates a task. A core part of the NPU is an operation circuit 903, and a controller 904 controls the operation circuit 903 to extract matrix data in a memory and perform a multiplication operation.

In an embodiment, the operation circuit 903 includes a plurality of process engines (PEs) inside. In an embodiment, the operation circuit 903 is a two-dimensional systolic array. The operation circuit 903 may alternatively be a one-dimensional systolic array or another electronic circuit capable of performing mathematical operations such as multiplication and addition. In an embodiment, the operation circuit 903 is a general-purpose matrix processor.

For example, it is assumed that there is an input matrix A, a weight matrix B, and an output matrix C. The operation circuit fetches, from a weight memory 902, data corresponding to the matrix B, and buffers the data on each PE in the operation circuit. The operation circuit fetches data of the matrix A from an input memory 901, to perform a matrix operation on the matrix B, and stores an obtained partial result or an obtained final result of the matrix in an accumulator 908.

A unified memory 906 is configured to store input data and output data. Weight data is directly transferred to the weight memory 902 through a direct memory access controller (DMAC) 905. The input data is also transferred to the unified memory 906 through the DMAC.

A BIU is a bus interface unit, namely, a bus interface unit 910, and is used for interaction between an AXI bus and the DMAC and between the AXI bus and an instruction fetch buffer (IFB) 909.

The bus interface unit (BIU for short) 910 is used by the instruction fetch buffer 909 to obtain instructions from an external memory, and is further used by the direct memory access controller 905 to obtain original data of the input matrix A or the weight matrix B from the external memory.

The DMAC is mainly configured to transfer input data in the external memory DDR to the unified memory 906, or transfer the weight data to the weight memory 902, or transfer the input data to the input memory 901.

A vector computing unit 907 includes a plurality of operation processing units; and if necessary, performs further processing such as vector multiplication, vector addition, an exponential operation, a logarithmic operation, or value comparison on an output of the operation circuit 903. The vector computing unit 907 is mainly configured to perform network computing, such as batch normalization, pixel-level summation, and upsampling on a prediction label plane, at a non-convolutional/fully connected layer in a neural network.

In an embodiment, the vector computing unit 907 can store a processed output vector in the unified memory 906. For example, the vector computing unit 907 may apply a linear function or a nonlinear function to the output of the operation circuit 903, for example, perform linear interpolation on a prediction label plane extracted at a convolutional layer. For another example, the vector computing unit 907 may apply a linear function or a nonlinear function to a vector of an accumulated value, to generate an activation value. In an embodiment, the vector computing unit 907 generates a normalized value, a pixel-level sum, or both a normalized value and a pixel-level sum. In an embodiment, the processed output vector can be used as an activation input to the operation circuit 903, for example, used at a subsequent layer in the neural network.

The instruction fetch buffer 909 connected to the controller 904 is configured to store instructions used by the controller 904.

The unified memory 906, the input memory 901, the weight memory 902, and the instruction fetch buffer 909 are all on-chip memories. The external memory is private for a hardware architecture of the NPU.

The processor mentioned above may be a general-purpose central processing unit, a microprocessor, an ASIC, or one or more integrated circuits for controlling program execution.

In addition, it should be noted that the apparatus embodiments described above are merely examples. The units described as separate parts may or may not be physically separate, and parts displayed as units may or may not be physical units, that is, may be located in one place, or may be distributed on a plurality of network units. Some or all of the modules may be selected based on an actual requirement, to achieve objectives of the solutions in embodiments. In addition, in the accompanying drawings of the apparatus embodiments provided in this application, a connection relationship between modules indicates that the modules have a communication connection with each other, and may be implemented as one or more communication buses or signal cables.

Based on the descriptions of the foregoing implementations, one of ordinary skilled in the art may clearly understand that this application may be implemented by software in addition to necessary universal hardware, or clearly may be implemented by dedicated hardware, including a dedicated integrated circuit, a dedicated CPU, a dedicated memory, a dedicated component, and the like. Usually, any function implemented by a computer program may be easily implemented by using corresponding hardware. In addition, hardware structures used to implement a same function may be various, for example, an analog circuit, a digital circuit, or a dedicated circuit. However, in this application, a software program implementation is a better implementation in most cases. Based on such an understanding, the technical solutions of this application essentially or the part contributing to the conventional technology may be implemented in a form of a software product. The computer software product is stored in a readable storage medium, such as a floppy disk, a USB flash drive, a removable hard disk, a ROM, a RAM, a magnetic disk, or an optical disc of a computer, and includes several instructions for instructing a computer device (which may be a personal computer, a training device, or a network device) to perform the methods in embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line (DSL)) or wireless (for example, infrared, radio, or microwave) manner. The computer-readable storage medium may be any usable medium that can be stored by the computer, or a data storage device, for example, a training device or a data center in which one or more usable media are integrated. The usable medium may be a magnetic medium (for example, a floppy disk, a hard disk, or a magnetic tape), an optical medium (for example, a DVD), a semiconductor medium (for example, a solid state disk (SSD)), or the like.

What is claimed is:

1. A model training method, comprising:

obtaining a first source domain image associated with a target domain image and a second source domain image associated with the target domain image;

obtaining a first prediction label of the first source domain image and a second prediction label of the second source domain image through a first model;

obtaining a third prediction label of the first source domain image and a fourth prediction label of the second source domain image through a second model;

obtaining a first loss based on the first prediction label, the fourth prediction label, and the second prediction label, wherein the first loss indicates a difference between the first prediction label and the second prediction label;

obtaining a second loss based on the first prediction label, the third prediction label, and the fourth prediction label;

updating a parameter of the first model based on the first loss, to obtain a first neural network; and updating a parameter of the second model based on the second loss, to obtain a second neural network.

2. The method according to claim 1, wherein the obtaining the first loss based on the first prediction label, the second prediction label, and the fourth prediction label comprises:

obtaining a label of the first source domain image;

obtaining a first subloss based on the first prediction label and the label of the first source domain image, wherein the first subloss indicates a difference between the first prediction label and the label of the first source domain image;

obtaining a second subloss based on the second prediction label and the fourth prediction label, wherein the second subloss indicates a difference between the second prediction label and the fourth prediction label; and performing summation based on the first subloss and the second subloss, to obtain the first loss.

3. The method according to claim 2, wherein the obtaining the second loss based on the first prediction label, the third prediction label, and the fourth prediction label comprises:

obtaining a label of the second source domain image;

obtaining a third subloss based on the fourth prediction label and the label of the second source domain image, wherein the third subloss indicates a difference between the fourth prediction label and the label of the second source domain image;

obtaining a fourth subloss based on the first prediction label and the third prediction label, wherein the fourth subloss indicates a difference between the first prediction label and the third prediction label; and performing summation based on the third subloss and the fourth subloss, to obtain the second loss.

4. The method according to claim 3, wherein before the performing summation based on the first subloss and the second subloss, to obtain the first loss, the method further comprises:

obtaining a fifth prediction label of the target domain image through the first model, and obtaining a sixth prediction label of the target domain image through the second model;

obtaining a label of the target domain image based on the fifth prediction label and the sixth prediction label;

obtaining a fifth subloss based on the fifth prediction label and the label of the target domain image, wherein the fifth subloss indicates a difference between the fifth prediction label and the label of the target domain image; and the performing summation based on the first subloss and the second subloss, to obtain the first loss comprises:

performing summation based on the first subloss, the second subloss, and the fifth subloss, to obtain the first loss.

5. The method according to claim 4, wherein before the performing summation based on the third subloss and the fourth subloss, to obtain the second loss, the method further comprises:

obtaining a sixth subloss based on the sixth prediction label and the label of the target domain image, wherein the sixth subloss indicates a difference between the sixth prediction label and the label of the target domain image; and the performing summation based on the third subloss and the fourth subloss, to obtain the second loss comprises:

performing summation based on the third subloss, the fourth subloss, and the sixth subloss, to obtain the second loss.

6. The method according to claim 1, further comprising:

converting the first source domain image, the second source domain image, and the target domain image from RGB color space to LAB color space;

obtaining, in the LAB color space, an average value of the first source domain image, a variance of the first source domain image, an average value of the second source domain image, a variance of the second source domain image, an average value of the target domain image, and a variance of the target domain image;

adjusting the first source domain image based on the average value of the first source domain image, the variance of the first source domain image, the average value of the target domain image, and the variance of the target domain image;

adjusting the second source domain image based on the average value of the second source domain image, the variance of the second source domain image, the average value of the target domain image, and the variance of the target domain image; and converting an adjusted first source domain image, an adjusted second source domain image, and the target domain image from the LAB color space to the RGB color space.

7. A model training apparatus, comprising:

a processor, and a memory coupled to the processor to store instructions, which when executed by the processor, cause the model training apparatus to perform operations, the operations comprising:

obtaining a first source domain image associated with a target domain image and a second source domain image associated with the target domain image;

obtaining a first prediction label of the first source domain image and a second prediction label of the second source domain image through a first model;

obtaining a third prediction label of the first source domain image and a fourth prediction label of the second source domain image through a second model;

obtaining a first loss based on the first prediction label, the fourth prediction label, and the second prediction label, wherein the first loss indicates a difference between the first prediction label and the second prediction label;

obtaining a second loss based on the first prediction label, the third prediction label, and the fourth prediction label; and updating a parameter of the first model based on the first loss, to obtain a first neural network; and updating a parameter of the second model based on the second loss, to obtain a second neural network.

8. The apparatus according to claim 7, wherein the obtaining the first loss based on the first prediction label, the second prediction label, and the fourth prediction label comprises:

obtaining a label of the first source domain image;

obtaining a first subloss based on the first prediction label and the label of the first source domain image, wherein the first subloss indicates a difference between the first prediction label and the label of the first source domain image;

obtaining a second subloss based on the second prediction label and the fourth prediction label, wherein the second subloss indicates a difference between the second prediction label and the fourth prediction label; and performing summation based on the first subloss and the second subloss, to obtain the first loss.

9. The apparatus according to claim 8, wherein the obtaining the second loss based on the first prediction label, the third prediction label, and the fourth prediction label comprises:

obtaining a label of the second source domain image;

obtaining a third subloss based on the fourth prediction label and the label of the second source domain image, wherein the third subloss indicates a difference between the fourth prediction label and the label of the second source domain image;

obtaining a fourth subloss based on the first prediction label and the third prediction label, wherein the fourth subloss indicates a difference between the first prediction label and the third prediction label; and performing summation based on the third subloss and the fourth subloss, to obtain the second loss.

10. The apparatus according to claim 9, wherein before the performing summation based on the first subloss and the second subloss, to obtain the first loss, the operations further comprises:

obtaining a fifth prediction label of the target domain image through the first model, and obtaining a sixth prediction label of the target domain image through the second model;

obtaining a label of the target domain image based on the fifth prediction label and the sixth prediction label;

obtaining a fifth subloss based on the fifth prediction label and the label of the target domain image, wherein the fifth subloss indicates a difference between the fifth prediction label and the label of the target domain image; and the performing summation based on the first subloss and the second subloss, to obtain the first loss comprises:

performing summation based on the first subloss, the second subloss, and the fifth subloss, to obtain the first loss.

11. The apparatus according to claim 10, wherein before the performing summation based on the third subloss and the fourth subloss, to obtain the second loss, the operations further comprises:

obtaining a sixth subloss based on the sixth prediction label and the label of the target domain image, wherein the sixth subloss indicates a difference between the sixth prediction label and the label of the target domain image; and the performing summation based on the third subloss and the fourth subloss, to obtain the second loss comprises:

performing summation based on the third subloss, the fourth subloss, and the sixth subloss, to obtain the second loss.

12. The apparatus according to claim 7, the operations further comprising:

converting the first source domain image, the second source domain image, and the target domain image from RGB color space to LAB color space;

obtaining, in the LAB color space, an average value of the first source domain image, a variance of the first source domain image, an average value of the second source domain image, a variance of the second source domain image, an average value of the target domain image, and a variance of the target domain image;

adjusting the first source domain image based on the average value of the first source domain image, the variance of the first source domain image, the average value of the target domain image, and the variance of the target domain image;

adjusting the second source domain image based on the average value of the second source domain image, the variance of the second source domain image, the average value of the target domain image, and the variance of the target domain image; and converting an adjusted first source domain image, an adjusted second source domain image, and the target domain image from the LAB color space to the RGB color space.

13. A non-transitory computer readable medium having instructions stored therein, which when executed by a processor, cause the processor to perform operations, the operations comprising:

obtaining a first source domain image associated with a target domain image and a second source domain image associated with the target domain image;

obtaining a first prediction label of the first source domain image and a second prediction label of the second source domain image through a first model;

obtaining a third prediction label of the first source domain image and a fourth prediction label of the second source domain image through a second model;

obtaining a first loss based on the first prediction label, the fourth prediction label, and the second prediction label, wherein the first loss indicates a difference between the first prediction label and the second prediction label;

obtaining a second loss based on the first prediction label, the third prediction label, and the fourth prediction label;

updating a parameter of the first model based on the first loss, to obtain a first neural network; and updating a parameter of the second model based on the second loss, to obtain a second neural network.

14. The non-transitory computer readable medium according to claim 13, wherein the obtaining the first loss based on the first prediction label, the second prediction label, and the fourth prediction label comprises:

obtaining a label of the first source domain image;

obtaining a first subloss based on the first prediction label and the label of the first source domain image, wherein the first subloss indicates a difference between the first prediction label and the label of the first source domain image;

obtaining a second subloss based on the second prediction label and the fourth prediction label, wherein the second subloss indicates a difference between the second prediction label and the fourth prediction label; and performing summation based on the first subloss and the second subloss, to obtain the first loss.

15. The non-transitory computer readable medium according to claim 14, wherein the obtaining the second loss based on the first prediction label, the third prediction label, and the fourth prediction label comprises:

obtaining a label of the second source domain image;

obtaining a third subloss based on the fourth prediction label and the label of the second source domain image, wherein the third subloss indicates a difference between the fourth prediction label and the label of the second source domain image;

obtaining a fourth subloss based on the first prediction label and the third prediction label, wherein the fourth subloss indicates a difference between the first prediction label and the third prediction label; and performing summation based on the third subloss and the fourth subloss, to obtain the second loss.

16. The non-transitory computer readable medium according to claim 15, wherein before the performing summation based on the first subloss and the second subloss, to obtain the first loss, the operations further comprises:

obtaining a fifth prediction label of the target domain image through the first model, and obtaining a sixth prediction label of the target domain image through the second model;

obtaining a label of the target domain image based on the fifth prediction label and the sixth prediction label;

obtaining a fifth subloss based on the fifth prediction label and the label of the target domain image, wherein the fifth subloss indicates a difference between the fifth prediction label and the label of the target domain image; and the performing summation based on the first subloss and the second subloss, to obtain the first loss comprises:

performing summation based on the first subloss, the second subloss, and the fifth subloss, to obtain the first loss.

17. The non-transitory computer readable medium according to claim 16, wherein before the performing summation based on the third subloss and the fourth subloss, to obtain the second loss, the operations further comprises:

obtaining a sixth subloss based on the sixth prediction label and the label of the target domain image, wherein the sixth subloss indicates a difference between the sixth prediction label and the label of the target domain image; and the performing summation based on the third subloss and the fourth subloss, to obtain the second loss comprises:

performing summation based on the third subloss, the fourth subloss, and the sixth subloss, to obtain the second loss.

18. The non-transitory computer readable medium according to claim 13, the operations further comprising:

converting the first source domain image, the second source domain image, and the target domain image from RGB color space to LAB color space;

obtaining, in the LAB color space, an average value of the first source domain image, a variance of the first source domain image, an average value of the second source domain image, a variance of the second source domain image, an average value of the target domain image, and a variance of the target domain image;

adjusting the first source domain image based on the average value of the first source domain image, the variance of the first source domain image, the average value of the target domain image, and the variance of the target domain image;

adjusting the second source domain image based on the average value of the second source domain image, the variance of the second source domain image, the average value of the target domain image, and the variance of the target domain image; and converting an adjusted first source domain image, an adjusted second source domain image, and the target domain image from the LAB color space to the RGB color space.

* * * * *